United States Patent
Zhu et al.

(10) Patent No.: US 10,955,875 B2
(45) Date of Patent: Mar. 23, 2021

(54) ACCESSORY DEVICE FOR AN ELECTRONIC DEVICE

(71) Applicant: Apple Inc., Cupertino, CA (US)

(72) Inventors: Hao Zhu, San Jose, CA (US); Yang Zhou, Sunnyvale, CA (US); Thomas R. Matzinger, Sunnyvale, CA (US); Guangtao Zhang, San Francisco, CA (US); Ming Yu, Saratoga, CA (US); Jaime G. Chavez Ruiz Garza, Palo Alto, CA (US); Florence W. Ow, Los Altos Hills, CA (US); James A. Stryker, San Francisco, CA (US); Travis C. Pedley, Scotts Valley, CA (US); Melody L. Kuna, San Jose, CA (US); Taylor Harrison Gilbert, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/848,335

(22) Filed: Apr. 14, 2020

(65) Prior Publication Data

US 2020/0241598 A1 Jul. 30, 2020

Related U.S. Application Data

(63) Continuation of application No. 16/415,649, filed on May 17, 2019, now Pat. No. 10,671,121.
(Continued)

(51) Int. Cl.
*G06F 1/16* (2006.01)
*H01R 13/62* (2006.01)
(Continued)

(52) U.S. Cl.
CPC .......... *G06F 1/1637* (2013.01); *G06F 1/1622* (2013.01); *G06F 1/1662* (2013.01);
(Continued)

(58) Field of Classification Search
CPC combination set(s) only.
See application file for complete search history.

(56) References Cited

U.S. PATENT DOCUMENTS

| 7,331,793 | B2 | 2/2008 | Hernandez et al. |
| 7,541,907 | B2 * | 6/2009 | Wang .................... G06F 1/1632 335/214 |

(Continued)

FOREIGN PATENT DOCUMENTS

| CN | 103488253 A | 1/2014 |
| CN | 205355397 U | 6/2016 |

(Continued)

OTHER PUBLICATIONS

Chinese Patent for Utility Model No. ZL201920936372.3—Evaluation Report for Utility Model Patent dated Apr. 26, 2020.
(Continued)

*Primary Examiner* — Lisa Lea-Edmonds
(74) *Attorney, Agent, or Firm* — Dickinson Wright RLLP

(57) ABSTRACT

Electronic devices and accessory devices for electronic devices are described. In some instances, an accessory device includes a keyboard and a cover rotatable with respect to the keyboard. In some instances, an accessory device includes a back panel and a foldable cover rotatable with respect to the back panel. These accessory devices may include several magnetic elements designed to magnetically couple with, and retain, an electronic device without any additional mechanical or other interlocking devices. In this regard, the magnetic elements in the accessory devices provide an external magnetic field sufficiently strong enough
(Continued)

to retain the electronic device, and can counter gravitational forces and/or the weight of the electronic device. However, some accessory devices include additional magnetic elements that provide an external magnetic field that repels magnetic elements in the electronic device. Also, the magnetic elements may also be used to hold different sections of the accessory device together.

20 Claims, 15 Drawing Sheets

Related U.S. Application Data

(60) Provisional application No. 62/731,608, filed on Sep. 14, 2018.

(51) Int. Cl.
 *H01R 24/66* (2011.01)
 *H01R 13/66* (2006.01)

(52) U.S. Cl.
 CPC ..... *H01R 13/6205* (2013.01); *H01R 13/6633* (2013.01); *H01R 13/6683* (2013.01); *H01R 24/66* (2013.01)

(56) References Cited

U.S. PATENT DOCUMENTS

| | | | | |
|---|---|---|---|---|
| 8,344,836 B2* | 1/2013 | Lauder | ............. | H01F 7/0205 |
| | | | | 335/219 |
| 8,570,725 B2* | 10/2013 | Whitt | ............. | G06F 3/0219 |
| | | | | 361/679.09 |
| 8,953,310 B2* | 2/2015 | Smith | ............. | G06F 1/3265 |
| | | | | 361/679.29 |
| 9,072,352 B2* | 7/2015 | Sartee | ............. | G06F 1/16 |
| 9,128,676 B2* | 9/2015 | Chang | ............. | G06F 1/1679 |
| 9,176,900 B2* | 11/2015 | Whitt | ............. | F16M 11/38 |
| 9,239,595 B2* | 1/2016 | Liang | ............. | G06F 1/1654 |
| 9,326,576 B2* | 5/2016 | Sartee | ............. | G06F 1/1675 |
| 9,531,119 B2 | 12/2016 | Szeto | | |
| 9,627,130 B2 | 4/2017 | Golko et al. | | |
| 9,627,803 B2 | 4/2017 | Szeto et al. | | |
| 9,645,614 B2* | 5/2017 | Delpier | ............. | G06F 1/1616 |
| 9,773,598 B2* | 9/2017 | Lauder | ............. | G06F 1/1637 |
| 9,778,705 B2* | 10/2017 | Esmaeili | ............. | G06F 1/1684 |
| 9,838,085 B2 | 12/2017 | Bosscher et al. | | |
| 9,905,964 B2 | 2/2018 | Degner et al. | | |
| 9,952,628 B2 | 4/2018 | Lee | | |
| 9,977,460 B2 | 5/2018 | Wagman et al. | | |
| 10,082,840 B2* | 9/2018 | Esmaeili | ............. | G06F 1/1669 |
| 10,317,953 B2* | 6/2019 | Esmaeili | ............. | G06F 1/1632 |
| 2013/0162668 A1* | 6/2013 | Lauder | ............. | G06F 1/1626 |
| | | | | 345/619 |
| 2013/0286551 A1* | 10/2013 | Ashcraft | ............. | G06F 1/1679 |
| | | | | 361/679.01 |
| 2013/0329359 A1* | 12/2013 | Andre | ............. | G06F 1/1616 |
| | | | | 361/679.55 |
| 2014/0262876 A1 | 9/2014 | Bates et al. | | |
| 2015/0041341 A1 | 2/2015 | Marshall et al. | | |
| 2015/0049426 A1* | 2/2015 | Smith | ............. | G06F 1/1628 |
| | | | | 361/679.27 |
| 2015/0098183 A1* | 4/2015 | Andre | ............. | H05K 5/0217 |
| | | | | 361/679.55 |
| 2015/0237979 A1 | 8/2015 | Huang | | |
| 2015/0318100 A1 | 11/2015 | Rothkopf et al. | | |
| 2016/0224125 A1 | 8/2016 | Sajid | | |
| 2016/0323006 A1 | 11/2016 | Sartee et al. | | |
| 2017/0068276 A1* | 3/2017 | Wagman et al. | ............. | G06F 1/1683 |
| 2017/0097663 A1* | 4/2017 | Gault | ............. | G06F 1/1662 |
| 2017/0177037 A1* | 6/2017 | Koo | ............. | G06F 1/1616 |
| 2017/0179641 A1* | 6/2017 | Shi | ............. | H01R 12/73 |
| 2017/0205847 A1* | 7/2017 | Wagman | ............. | G06F 1/1679 |
| 2018/0059733 A1* | 3/2018 | Gault | ............. | G06F 1/1635 |
| 2018/0191394 A1 | 7/2018 | Kao et al. | | |
| 2018/0196473 A1* | 7/2018 | Smith | ............. | G06F 1/1656 |
| 2019/0164675 A1* | 5/2019 | Srinivasan | ............. | G06F 1/1679 |

FOREIGN PATENT DOCUMENTS

| | | |
|---|---|---|
| CN | 106502318 A | 3/2017 |
| CN | 206147403 U | 5/2017 |
| CN | 206162271 U | 5/2017 |

OTHER PUBLICATIONS

International Application No. PCT/US2019/033823 International Search Report and Written Opinion dated Sep. 11, 2019.

* cited by examiner

ACCESSORY DEVICE FOR AN ELECTRONIC DEVICE

CROSS-REFERENCE TO RELATED APPLICATION(S)

The present application is a continuation of U.S. application Ser. No. 16/415,649, filed May 17, 2019, entitled "MAGNETIC LAYOUT IN ELECTRONIC DEVICES AND ACCESSORY DEVICES FOR ELECTRONIC DEVICES," issued on Jun. 2, 2020 as U.S. Pat. No. 10,671,121, which claims the benefit of U.S. Provisional Application No. 62/731,608 filed Sep. 14, 2018 of the same title, the contents of all of which are incorporated by reference herein in their entirety for all purposes.

FIELD

The following description relates to accessory devices suitable for use with portable electronic devices. In particular, the following description relates to accessory devices with magnets designed to magnetically couple with magnets in portable electronic devices as well as other magnets within the accessory device.

BACKGROUND

Accessory devices can provide a protective cover for electronic device. Accessory devices can cover a cover glass and a housing of the electronic device.

SUMMARY

In one aspect, an accessory device for an electronic device is described. The accessory device may include a first section. The first section may include a first magnetic element capable of magnetically coupling with a first device magnet of the electronic device and aligning the electronic device with the first section. The first section may further include electrical contacts that electrically couple with device contacts of the electronic device. The first section may further include a second magnetic element capable of magnetically coupling with a second device magnet of the electronic device and aligning the device contacts with the electrical contacts. The accessory device may further include a second section rotationally coupled with the first section. The second section may include a channel capable of receiving the electronic device. The second section may further include a keyboard separate from the channel and in electrical communication with the electronic device via the electrical contacts.

In another aspect, an accessory device for an electronic device is described. The accessory device may include a first section that includes a first magnetic element capable of magnetically coupling with a first device magnet of the electronic device. The accessory device may include a second section rotationally coupled with the first section, the second section that includes a second magnetic element capable of magnetically coupling with a second device magnet of the electronic device. The accessory device may further include a first compensating magnetic element located in the first section. The accessory device may further include a second compensating magnetic element located in the second section. In some instances, the first compensating magnet and the second compensating magnet neutralize the first magnetic element and the second magnetic element.

In another aspect, an accessory device for an electronic device is described. The accessory device may include a first section that includes a first magnetic element and a second magnetic element. The first magnetic element may provide a magnetic attraction force with a device magnet of the electronic device. The second magnetic element may provide a magnetic repulsion force with the device magnet. The accessory device may include a second section rotationally coupled with the first section. The second section may include a keyboard in communication with the electronic device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
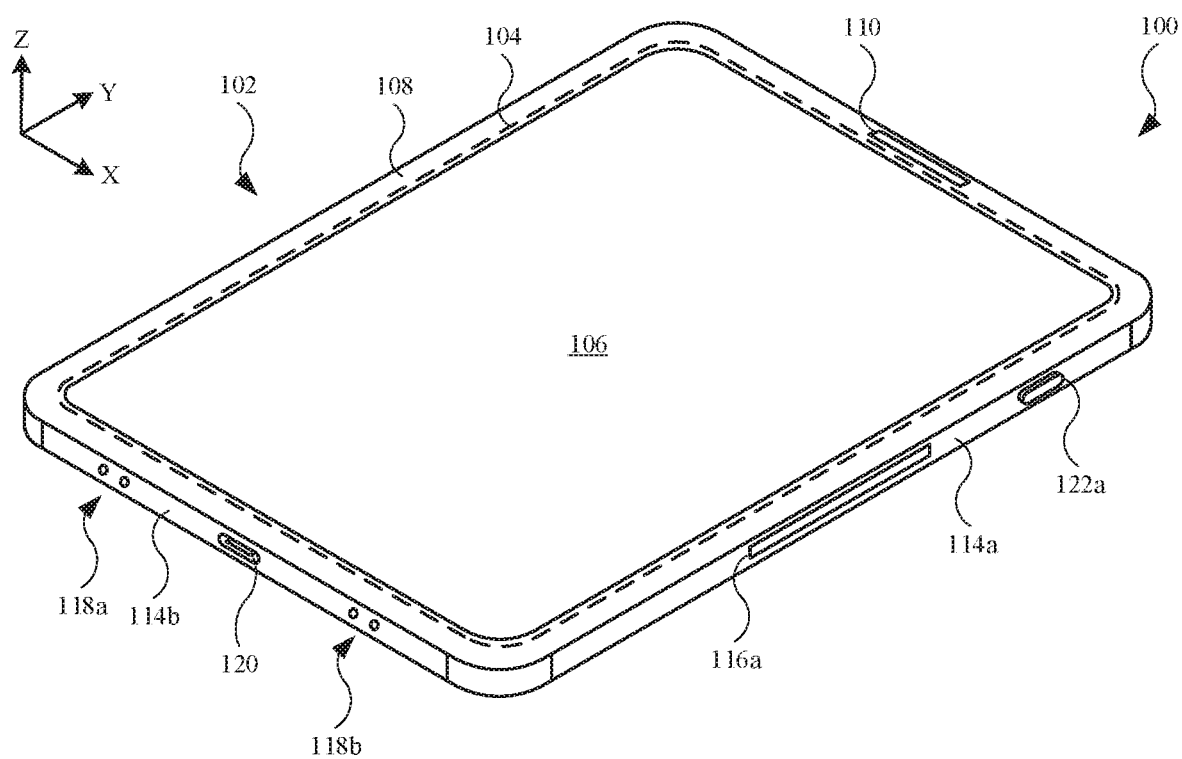
FIG. 1 illustrates a front isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to electronic devices and accessory devices designed for use with electronic devices. Electronic devices described herein may include portable computing devices, such as tablet computing devices, smartphones, and laptop computing devices. Accessory devices described herein may be referred to as portable accessory devices, accessory cases, accessory covers, or folios, as non-limiting examples. Accessory devices described herein may include a cover having segments foldable with respect to each other, as well as a keyboard coupled with the cover in a manner that allows rotational movement between the cover and the keyboard. The cover may further include electrical contacts designed to engage electrical contacts of the electronic device and place the electronic device in electrical communication with the accessory device.

Accessory devices described herein may include several magnetic elements designed and positioned not only to magnetically couple with magnetic elements in an electronic device, but also with other magnetic elements within the accessory device. Further, accessory devices described herein may include magnetic elements that generate an external magnetic field sufficient enough to retain the electronic device, even when gravitational forces are acting on the electronic device that would otherwise cause the electronic device to fall off of the accessory device. Further, based on the position of the various magnetic elements, accessory devices described herein may be configured in various manners, providing additional flexibility and benefits to users.

Some accessory devices described herein include multiple sections, with some sections providing foldable covers while other sections provide keyboards (in some instances). Further, some accessory devices described herein include channels used to retain an edge of an electronic device. These accessory devices may include additional magnetic elements surrounding the channels in order to magnetically couple with magnetic elements in the electronic device.

These and other embodiments are discussed below with reference to FIGS. 1-18. However, those skilled in the art will readily appreciate that the detailed description given herein with respect to these Figures is for explanatory purposes only and should not be construed as limiting.

FIG. 1 illustrates an isometric front view of an embodiment of an electronic device 100, in accordance with some described embodiments. The electronic device 100 may be referred to as a portable electronic device. For example, in some embodiments, the electronic device 100 is a laptop computing device. In other embodiments, the electronic device 100 is a mobile wireless communication device, such as a smartphone. In the embodiment shown in FIG. 1, the electronic device 100 is a tablet computing device designed for user interaction and wireless communication.

The electronic device 100 may include an enclosure 102, or housing, designed to provide an internal volume (not labeled) to store several components, including (as non-limiting examples) circuit boards, processor circuits, memory circuits, battery (or batteries), audio modules (such as speakers), microphones, cameras, light emitters and receivers, and flexible circuitry that electrically connect at least some of the aforementioned components to each other. The enclosure 102 may include a back wall and multiple sidewalls that extend from, and combine with, the back wall define the internal volume. The enclosure 102 may include a rigid material, including a metal (such as aluminum or an alloy that includes aluminum), ceramic, or hardened plastic, as non-limiting examples.

The electronic device 100 may further include a display assembly 104 (shown as a dotted line). Although not shown, the display assembly 104 may include multiple layers, including a display layer designed to provide visual information. The display assembly 104 may further include a touch input layer designed to receive a touch input, and provide a location of the touch input. The touch input layer may include capacitive touch technology used to form an electrostatic field and use changes in the electrostatic field to locate the touch input. The electronic device 100 may further include a transparent cover 106 positioned over the display assembly 104 and coupled with the enclosure 102. The transparent cover 106 may provide a protective cover to the display assembly 104 as well as the aforementioned components stored in the internal volume. The transparent cover 106 may include a see-through material, such as glass, plastic, sapphire or the like. The electronic device 100 may further include a border 108 that extends around a perimeter of the transparent cover 106 and covers edges of the display assembly 104. The border 108 may provide an opaque barrier that hides or obscures electrical connections between the display assembly 104 and other components (not shown in FIG. 1). The border 108 may be applied to an internal surface of the transparent cover 106, and accordingly, the border 108 faces the internal volume. However, in some instances (not shown), the border 108 may be applied to an external surface. Also, the border 108 may include a uniform dimension along the X-axis as well as the Y-axis. In this manner, the border 108 may appear uniform along a two-dimensional plane, thereby providing the electronic device 100 with an aesthetic and consistent finish.

While the border 108 is opaque, or at least substantially opaque, some portions of the border 108 can be removed to form an opening (or openings). Further, the opening(s) in the border 108 can be filled with a material that provides a light transmission (or translucent) quality, while also matching, or at least substantially matching, the appearance (in terms of color and/or reflectivity) of the border 108. For example, the border 108 may include an opening with a material 110 that fills the opening. The material 110 may include an ink material (as a non-limiting example) that includes an appearance that matches that of the border 108. For example, if the border 108 appears black, the material 110 may also appear black while still allowing light passage. In this manner, the electronic device 100 may include a vision system used for user authentication, as well as light sensors that detect an amount of light incident on the electronic device 100. These features will be shown below.

When the enclosure 102 is formed from a metal, some parts of the enclosure 102 may undergo a machining operation to remove the metal, and a non-metal may fill the void in the enclosure 102 left from the machining operation. For example, the enclosure 102 may include a sidewall 114a having an opening, or window, that opens into the internal volume of the electronic device 100, and a non-metal material 116a that fills the opening. The non-metal material 116a may include plastic, resin, and/or adhesives. In this manner, the electronic device 100 may include components, such as an inductive charging unit and antennae (not shown in FIG. 1), positioned in the internal volume along the non-metal material 116a. The non-metal material 116a provides minimal, if any, blockage of radio frequency communication to and from the antennae. Accordingly, the non-metal material 116a may be referred to as a radio frequency window. Further, the non-metal material 116a provides minimal, if any, blockage of induced electrical current from the inductive charging unit. As a result, the inductive charging unit can be used to charge an object or an accessory, such as a digital stylus, that is used to provide a touch input to the display assembly 104. These features will be shown below.

The enclosure 102 may further include through holes, or openings, that lead to the internal volume. For example, the sidewall 114b may include through holes 118a and through holes 118b. The through holes 118a and the through holes 118b may be used to allow acoustical energy generated by audio modules (not shown in FIG. 1) to exit the electronic device 100. Also, at least some of the through holes 118a and the through holes 118b may be used to receive acoustical energy, thereby allowing a microphone(s) (not shown in FIG. 1) in the electronic device 100 to process the acoustical energy. Although a discrete number of through holes are shown in the sidewall 114b, the number of through holes may vary. The electronic device 100 may include a connector 120 located in a through hole of the sidewall 114b. The connector 120 may electrically couple with a central processing unit (not shown in FIG. 1) on a circuit board in the internal volume, as well as a battery (or batteries, not shown) in the internal volume. In this manner, the electronic device 100 may receive and transmit data for the central processing unit, and may also receive electrical energy use to charge and re-charge the battery (or batteries). The connector 120 may include a Universal Serial Bus ("USB") connector, including a connector with USB-C protocol. However, the connector 120 may take the form of other standardized connectors.

Also, the electronic device 100 may include an input mechanism 122a located on the sidewall 114a. In some embodiments, the input mechanism 122a is a switch or a button mechanically coupled to an internal switch. The input mechanism 122a may be designed for actuation (such as a depression or lateral movement) to generate a command to alter the display assembly 104 or provide some other function, such as controlling the volume of the audio modules (not shown in FIG. 1). Although the input mechanism 122a is located on the sidewall 114a, other locations (both on the sidewall 114a and other sidewalls) are possible.

Figure 2:
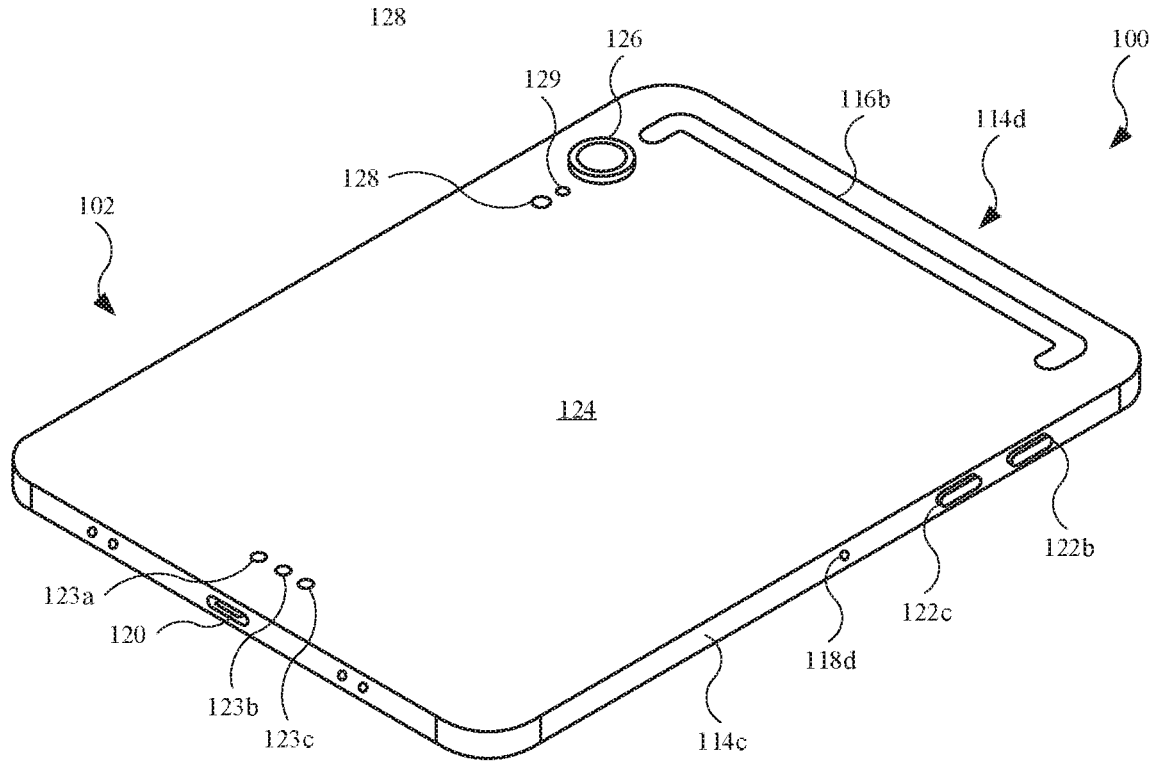
FIG. 2 illustrates a rear isometric view of the electronic device shown in FIG. 1, showing additional features of the electronic device.

FIG. 2 illustrates an isometric back view of the electronic device 100 shown in FIG. 1, showing additional features of the electronic device 100. The enclosure 102 may include a wall 124, also referred to as a bottom wall or back wall, with several openings to allow for additional features. For example, the wall 124 may include an opening filled with a non-metal material 116b. The non-metal material 116b may include plastic, resin, and/or adhesives, as non-limiting examples. In this manner, the wall 124 may permit radio frequency into and out of the enclosure 102 by way of the non-metal material 116b. The wall 124 may further include openings for a camera assembly 126, a flash module 128, and a microphone 129.

The enclosure 102 may further include a sidewall 114c that includes an opening 118d for a microphone (shown later). The sidewall 114c may further include an input mechanism 122b and an input mechanism 122c, both of which may include any feature previously described for the input mechanism 122a (shown in FIG. 1). Also, the enclosure 102 may include a sidewall 114d having through holes similar to the through holes 118a and the through holes 118b (shown in FIG. 1). The through holes in sidewall 114d can be used for additional audio modules and microphones (shown below).

In addition to the connector 120, other features can place the electronic device 100 in communication with external devices. For example, the electronic device 100 may include an electrical contact 123a, an electrical contact 123b, and an electrical contact 123c. These contacts may be referred to as device contacts. The electrical contact 123a, the electrical contact 123b, and the electrical contact 123c may include metal contacts designed to electrically couple with an accessory device (not shown in FIG. 2), such as a cover, a folio, and/or a cover-keyboard accessory.

Figure 3:
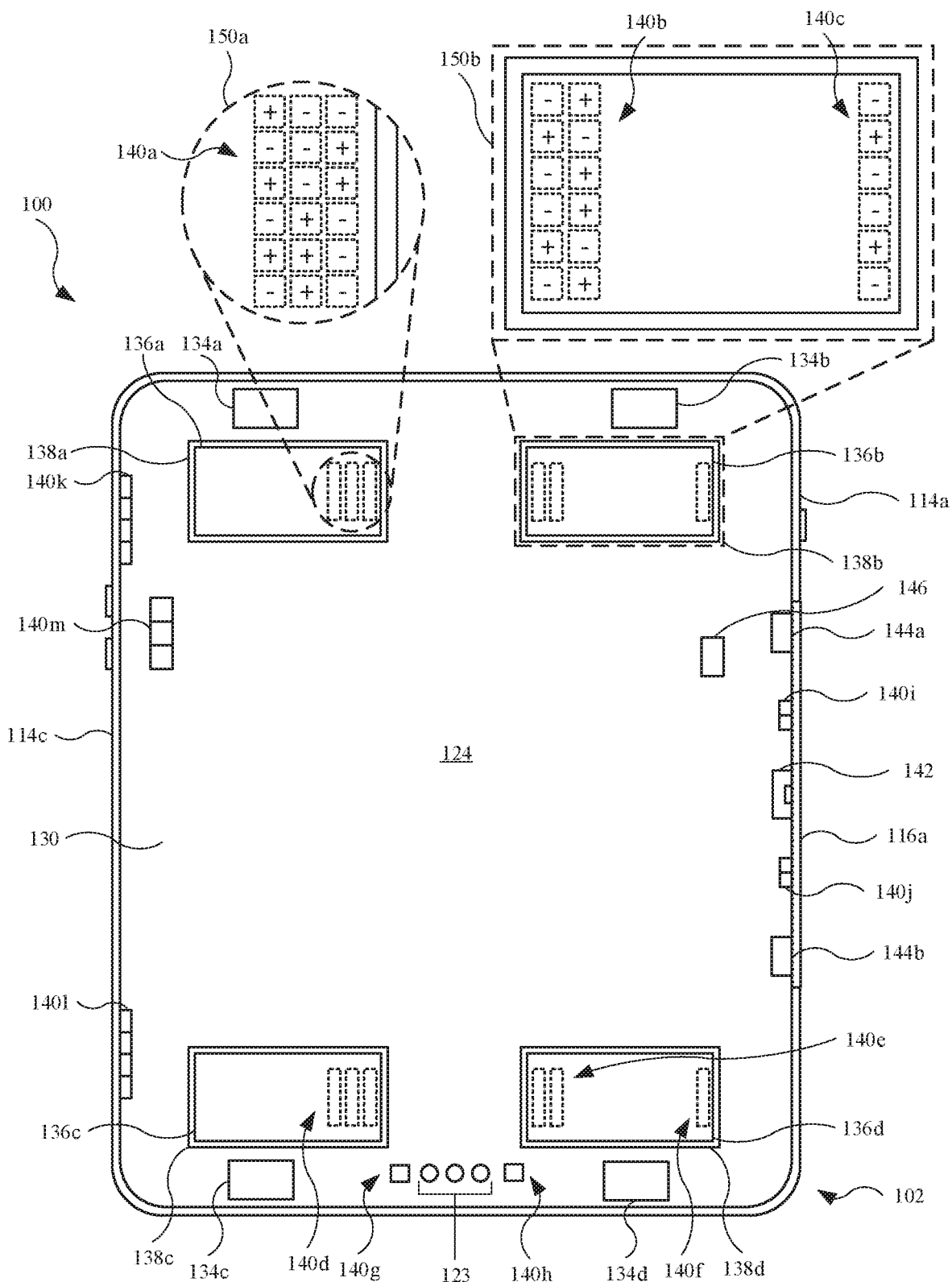
FIG. 3 illustrates a plan view of the electronic device, showing several internal components of the electronic device.

FIG. 3 illustrates a plan view of the electronic device 100, showing several internal components of the electronic device 100. For purposes of simplicity illustration, the transparent cover 106 and the display assembly 104 are removed to show additional features. Several additional features may not be included in FIG. 3 as well. As shown, the enclosure 102 may define an internal volume 130 that provides a space to carry the components of the electronic device 100. Although not shown, the internal volume 130 may provide space for a circuit board that carries several processor circuits, some of which may serve as a central processing unit, a graphics processing unit, and a memory circuit. The internal volume 130 may also provide space for battery modules, microphones, and flexible circuits, as non-limiting examples.

The electronic device 100 may include several audio modules in the internal volume 130 of the enclosure 102. For example, the electronic device 100 may include an audio module 134a and an audio module 136a. In some embodiments, the audio module 134a is designed to generate acoustical energy, in the form of audible sound, approximately in the range of 2,000-20,000 Hertz ("Hz"), but in some case the range may be higher than 20,000 Hz. In some embodiments, the audio module 136a is designed to generate acoustical energy, in the form of audible sound, approximately in the range of 20-5,000 Hz. In this regard, the audio module 134a may be referred to as a tweeter, and the audio module 136a may be referred to as a woofer.

While both the audio module 134a and the audio module 136a may be secured (including adhesively secured) with the wall 124, the audio module 136a may secure with internal walls 138a that extends from the wall 124. The internal walls 138a may be integrally formed with the wall 124. In other words, the enclosure 102 may be formed from a block of material that undergoes a machining operation such that the wall 124 and the internal walls 138a are formed as a continuous structure. As shown in FIG. 3, the internal walls 138a are positioned between the sidewalls of the enclosure 102. The electronic device 100 may further include additional audio modules, including an audio module 134b, an audio module 134c, and an audio module 134d, that include similar features described for the audio module 134a. Also, the electronic device 100 may further include additional audio modules, including an audio module 136b, an audio module 136c, and an audio module 136d, that include similar features described for the audio module 136a, with the audio module 136b, the audio module 136c, and the audio module 136d secured with internal walls 138b, internal walls 138c, and internal walls 138d, respectively. Also, although not shown, the sidewalls of the enclosure 102 may include several through holes, or openings, that allow acoustical energy generated by at least some of the audio modules to exit the electronic device 100.

As known in the art for audio modules, the audio module 136a may include a permanent magnet (not shown in FIG. 2) as well as an electromagnet (not shown in FIG. 2). However, additional magnetic elements may be housed between the internal walls 138a that secure the audio module 136a. For example, the electronic device 100 may include magnetic elements 140a positioned between the internal walls 138a. The magnetic elements 140a (shown as dotted lines) are covered by a cap that is part of the audio module 136a. However, the magnetic elements 140a are separate (both physically and functionally) from magnets used by the audio module 136a. The magnetic elements 140a may be secured with the wall 124 by adhesives, as a non-limiting example. Also, magnetic elements shown and described in the electronic device 100 may be referred to as device magnets.

As shown in the first enlarged view 150a, the magnetic elements 140a may include multiple rows of discrete magnetic elements. Further, the magnetic elements 140a are arranged in a pattern in which some of the magnetic elements include a North Pole (or North-facing polarity) denoted by a "+" that faces away from the wall 124, while remaining magnetic elements of the magnetic elements 140a include a South Pole (or South-facing polarity) denoted by a "−" that faces away from the wall 124. As shown, the magnetic elements 140a include a 3×6 matrix of magnetic elements. However, the number of magnetic elements may vary.

The electronic device 100 may include further magnetic elements 140b and magnetic elements 140c positioned between the internal walls 138b. Similar to the magnetic elements 140a, the magnetic elements 140b and the magnetic elements 140c are covered by a cap that is part of the audio module 136b, and are separate (both physically and functionally) from magnets used by the audio module 136b. As shown in the second enlarged view 150b, the magnetic elements 140b may include multiple rows of discrete magnetic elements. Further, the magnetic elements 140b are arranged in a pattern in which some of the magnetic elements include a North Pole that faces away from the wall 124, while remaining magnetic elements of the magnetic elements 140b include a South Pole that faces away from the wall 124. As shown, the magnetic elements 140b include a 2×6 matrix of magnetic elements. However, the number of magnetic elements may vary. Also, the magnetic elements 140c may include a single column of magnetic elements, some of which include a North Pole that faces away from the wall 124, while others include a South Pole that faces away from the wall 124.

The electronic device 100 may include further magnetic elements 140d positioned between the internal walls 138c. Similar to the magnetic elements 140a, the magnetic elements 140d are covered by a cap that is part of the audio module 136c, and are separate (both physically and functionally) from magnets used by the audio module 136c. The electronic device 100 may include further magnetic elements 140e and magnetic elements 140f positioned between the internal walls 138d. Similar to the magnetic elements 140b, the magnetic elements 140e are covered by a cap that is part of the audio module 136d, and are separate (both physically and functionally) from magnets used by the audio module 136d. Although not discretely shown, the magnetic elements 140d may include a 3×6 matrix of magnetic elements, which may be arranged in a similar layout/arrangement as that of the magnetic elements 140a. However, the layout/arrangement may differ. Also, although not discretely shown, the magnetic elements 140e and the magnetic elements 140f may include a 2×6 matrix and a single column of magnetic elements, respectively. The layout/arrangement of the magnetic elements 140e and the magnetic elements 140f may be similar layout/arrangement as that of the magnetic elements 140b and the magnetic elements 140c, respectively. However, the layouts/arrangements may differ.

The aforementioned magnetic elements may magnetically couple with magnetic elements in various accessory devices described herein, thereby coupling the electronic device 100 with the accessory devices. Moreover, the magnetic coupling between the magnetic elements in the electronic device 100 with accessory devices described herein provide a magnetic attraction force that allows accessory devices to hold and retain the electronic device 100, and even overcome gravitational forces acting against the magnetic attraction force.

When magnetically coupled with magnetic elements in the accessory device, the aforementioned magnetic elements in the electronic device 100 may provide a large-scale adjustment of the electronic device 100 relative to the accessory device by, for example, providing a force that moves the electronic device 100 approximately a few centimeters to align the corners of the electronic device 100 with the corners of the accessory device. Further, the electronic device 100 may include magnetic elements 140g and magnetic elements 140h designed and positioned to magnetically couple with magnetic elements accessory devices. The magnetic coupling of the magnetic elements 140g and magnetic elements 140*h* with magnetic elements in an accessory device may provide a small-scale adjustment of the electrical contacts 123 relative to electrical contacts of the accessory device by, for example, providing a force that moves the electronic device 100 approximately a few millimeters to align the electrical contacts 123 with the electrical contacts of the accessory device and ensure engagement, thereby placing the electronic device 100 in electrical communication with the accessory device.

Also, the aforementioned magnetic elements may include permanent magnets such as neodymium. Further, the remanence of the aforementioned magnetic elements may vary among the discrete magnetic elements. For example, some magnetic elements may include a relatively high remanence to increase locally increase external magnetic field and provide an additional magnetic attraction force, while some magnetic elements may include a relatively low remanence to locally reduce the overall external magnetic field and prevent the external magnetic field from interacting with magnetically-sensitive items (such as credit cards) placed externally on the wall 124 of the electronic device 100.

The electronic device 100 may further include an inductive charging unit 142. The inductive charging unit 142 may include a ferrite coil designed to receive an alternating electrical current from an internal power source (not shown in FIG. 3), such as a battery module. The direct current ("DC") provided by the battery module may pass through an inverter (not shown in FIG. 3) to generate the alternating electrical current. As a result, the inductive charging unit 142 can subsequently provide an alternating electromagnetic field (not shown in FIG. 3), and act as a transmitter coil to inductively charge a power source (not shown in FIG. 3) of an object that is external to the electronic device 100, such as a digital stylus positioned against the sidewall 114*a*. This will be shown below. A partial cross section of the sidewall 114*a* is shown in order to show the non-metal material 116*a*. The inductive charging unit 142 is aligned with the non-metal material 116*a* and the electromagnetic field generated by the inductive charging unit 142 may pass through the non-metal material 116*a* and induce electrical current into the object. The electronic device 100 may include magnetic elements 140*i* and magnetic elements 140*j* positioned along the sidewall 114*a*, including the non-metal material 116*a*. The magnetic elements 140*i* and magnetic elements 140*j* are designed to magnetically couple with magnets in the object that can be positioned against the sidewall 114*a* and inductively charged by the inductive charging unit 142. Further, the magnetic elements 140*i* and magnetic elements 140*j* can be used to generally carry and store the object through magnetic attraction.

The electronic device 100 may include an antenna 144*a* and an antenna 144*b* located along the non-metal material 116*a*. The antenna 144*a* and the antenna 144*b* may enable wireless communication. Further, each antenna may provide radio frequency communication within a specific range of frequencies. For instance, the antenna 144*a* may provide Wi-Fi communication and the antenna 144*b* may provide Bluetooth® communication. Other antennae (not shown in FIG. 3) may enable cellular network communication.

The electronic device 100 may include magnetic elements 140*k* and magnetic elements 140*l* positioned along the sidewall 114*c*. The magnetic elements 140*k* and magnetic elements 140*l* are designed to magnetically couple with magnetic elements in an accessory device (not shown in FIG. 3), such as a cover, a folio, or a cover-keyboard accessory. Further, the magnetic elements 140*k* and magnetic elements 140*l* may position the electronic device 100 in a manner such that the sidewall 114*c* defines a base for the electronic device 100. This will be shown below. The electronic device 100 may further include magnetic elements 140*m* designed to magnetically couple with magnets of an accessory device (not shown in FIG. 3) designed to cover the electronic device 100. Also, in order to assist in determining a user's orientation, the electronic device 100 may include a compass 146. The compass 146 may include a magnetometer designed to determine the Earth's magnet field.

Figure 4:
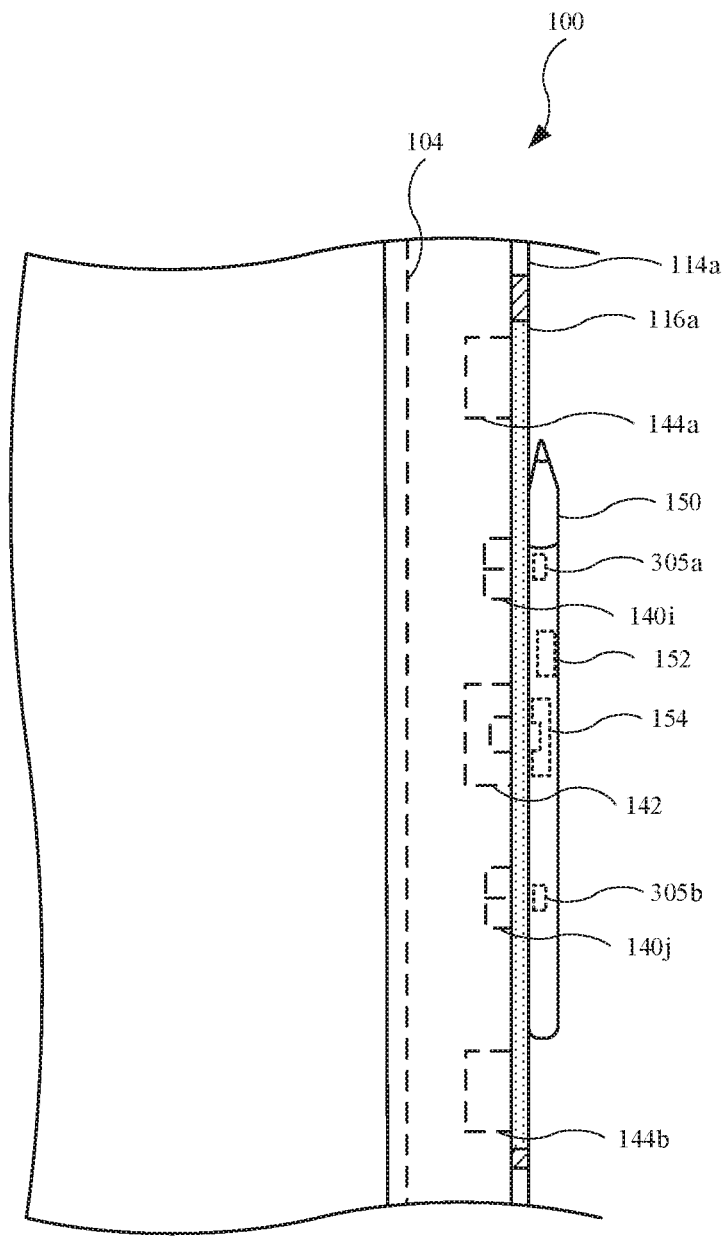
FIG. 4 illustrates a plan view of the electronic device, showing an object positioned against the sidewall.

FIG. 4 illustrates a plan view of the electronic device 100, showing an object 150 positioned against the sidewall 114*a*. A partial cross sectional view of the sidewall 114*a* shows the non-metal material 116*a*. The object 150 may include a digital stylus capable of interacting and providing an input to the display assembly 104, and in particular, the touch input layer (not shown in FIG. 4) of the display assembly 104. In order for the object 150 to interact with the touch input layer, the object 150 requires a battery 152 to supply electrical current to a capacitive component and to radio frequency components (not shown in FIG. 4) of the object 150, both of which may be used to communicate with the electronic device 100. The battery 152 of the object 150 may include a rechargeable battery.

The inductive charging unit 142 of the electronic device 100 can charge the battery 152. The inductive charging unit 142 may act as transmitter coil and inductively charge the battery 152 by inducing an alternating current ("AC") to a receiver coil 154 of the object 150. The induced current may pass through an AC-to-DC converter, such as a rectifier, and may subsequently be used to charge or recharge the battery 152. To induce the current to the battery 152, the inductive charging unit 142 and the object 150 are positioned along the non-metal material 116*a*. In order to maintain the object 150 against the sidewall 114*a* (or against the non-metal material 116*a*), the magnetic elements 140*i* and the magnetic elements 140*j* may magnetically couple with magnetic elements 305*a* and magnetic elements 305*b*, respectively, in the object 150. Also, as shown, the antenna 144*a* and the antenna 144*b* are positioned along the non-metal material 116*a*, thereby allowing the antenna 144*a* and the antenna 144*b* to send and receive RF communication.

Figure 5:
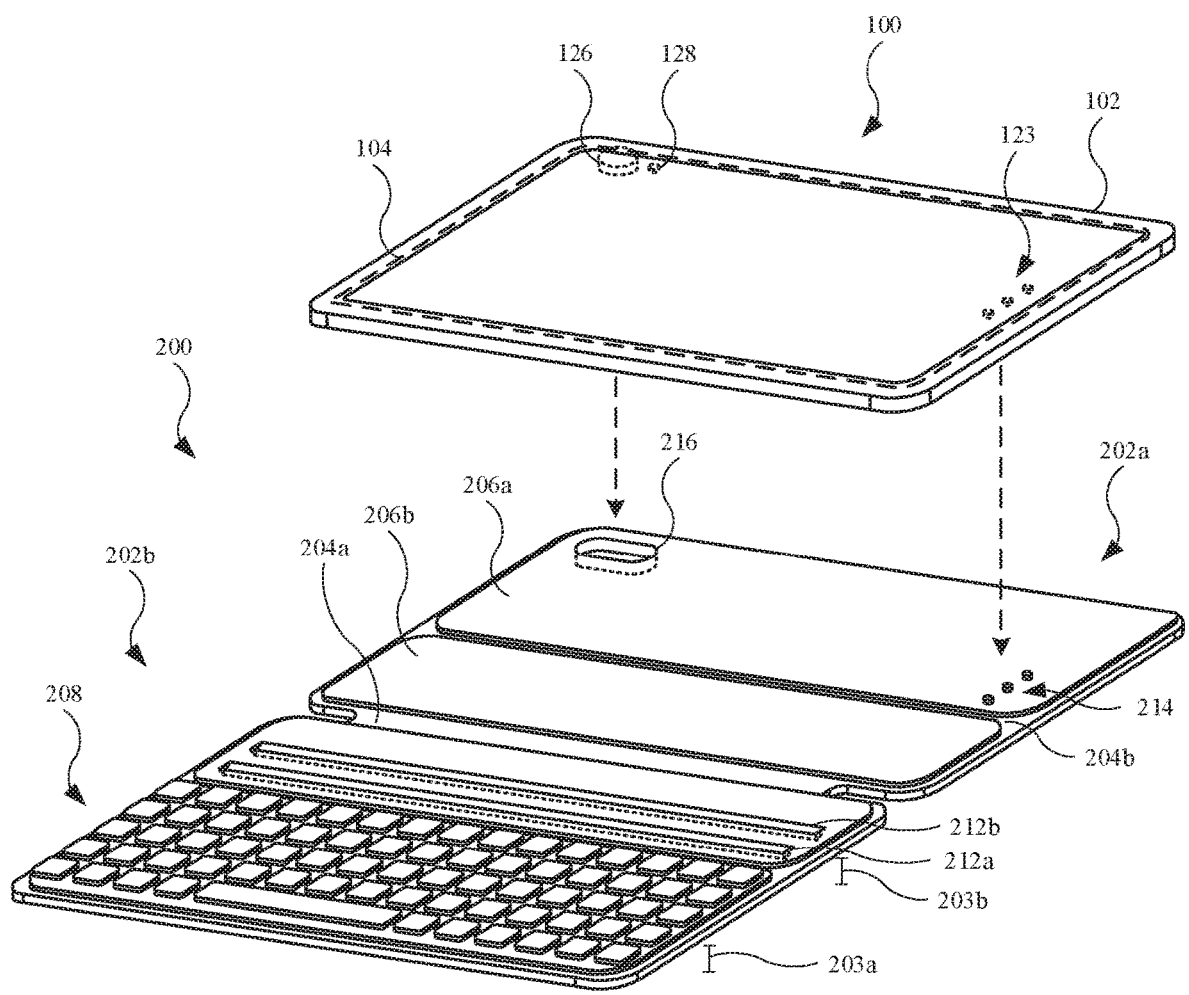
FIG. 5 illustrates an isometric view of an embodiment of an accessory device for use with the electronic device, in accordance with some described embodiments.

FIG. 5 illustrates an isometric view of an embodiment of an accessory device 200 for use with the electronic device 100, in accordance with some described embodiments. The accessory device 200 is designed as a complementary device for an electronic device 100. As shown, the accessory device 200 may include a first section 202*a* and a second section 202*b* connected to the first section 202*a*. The accessory device 200 may include a hinge 204*a* that connects the first section 202*a* with the second section 202*b*. The hinge 204*a* allows the first section 202*a* to rotate or pivot with respect to the second section 202*b*, and vice versa. The hinge 204*a* may include a flexible material (such as polyurethane, as a non-limiting example) that defines an outer layer (or layers) extending across both the first section 202*a* and the second section 202*b*.

The first section 202*a*, also referred to as a cover, a cover portion, a cover section, an electronic device cover, or a segmented cover, may define a receiving surface for the electronic device 100, with the receiving surface having a size and shape to receive a back surface of the enclosure 102 (which defines a major surface of the enclosure 102). The first section 202*a* may include a first segment 206*a* and a second segment 206*b* that define that collectively define the receiving surface. The first segment 206*a* is separated from the second segment 206*b* by a hinge 204*b* positioned between the first segment 206a and the second segment 206b. The hinge 204b allows rotational movement of the first segment 206a relative to the second segment 206b, and vice versa. The hinge 204b may be formed from the layer(s) used to form the hinge 204a. In some embodiments (not shown in FIG. 5), the first segment 206a and the second segment 206b are the same size, generally. In the embodiment shown in FIG. 5, the first segment 206a is larger than the second segment 206b. Also, the first segment 206a and the second segment 206b may each include a microfiber layer (not labeled). In some instances, the microfiber layer is restricted to the first segment 206a and the second segment 206b such that the microfiber layer does not cover the hinge 204b.

The second section 202b, also referred to as a keyboard section or a keyboard cover, may include a keyboard 208. The keyboard 208 may include several keys (not labeled) arranged in a QWERTY configuration, as a non-limiting example. The second section 202b may further include one or more channels designed to provide a location that is below or sub-flush with respect to a remaining location of the second section 202b. For example, the second section 202b may include a first channel 212a and a second channel 212b. The first channel 212a and the second channel 212b are designed to receive the electronic device 100 (or a portion of the electronic device 100) in order to place and position the electronic device 100 in a manner such that the electronic device 100 can be used with the keyboard 208. Also, the second section 202b may include a dimension 203a measured from a rear surface of the second section 202b to a key of the keyboard 208. The second section 202b may include a dimension 203b measured from a rear surface of the second section 202b to a section that surrounds the first channel 212a and the second channel 212b. The dimension 203a may be the same as, or substantially similar to, the dimension 203b, such that the keys of the keyboard 208 are planar with respect to the section surrounding the first channel 212a and the second channel 212b. In this manner, when the electronic device 100 is coupled to the first section 202a and the first section 202a is folded over the second section 202b, the electronic device 100 may lie flat, or horizontal, on the second section 202b.

The first section 202a may include electrical contacts 214 designed to engage electrical contacts 123 of the electronic device 100, and place the accessory device 200 in communication (including electrical communication) with electronic device 100. The electrical contacts 214 may be referred to as device contacts. When the accessory device 200 is in communication with the electronic device 100, the keyboard 208 can be used to provide inputs and commands to the electronic device 100 to control the display assembly 104. As shown, the electrical contacts 214 are located on the first segment 206a. However, other locations are possible (such as the second segment 206b). Generally, the electrical contacts 214 can be at any location corresponding to the location of the electrical contacts 123 such that the electronic device 100 lies within an outer perimeter of the first section 202a when the electronic device 100 is in contact with the first section 202a. Also, while the electrical contacts 214 represent a physical/direct communication between the accessory device 200 and the electronic device 100, the accessory device 200 and the electronic device 100 may also be in communication via wireless communication, such as Bluetooth® communication, as a non-limiting example.

The first section 202a may further include an opening 216, or through hole, designed to receive the camera assembly 126 and the flash module 128 (shown as dotted lines). As shown, the opening 216 is located on the first segment 206a. However, other locations are possible. Generally, the opening 216 can be at any location corresponding to the location of the camera assembly 126 and the flash module 128 such that the electronic device 100 lies within an outer perimeter of the first section 202a when the electronic device 100 is in contact with the first section 202a.

Figure 6:
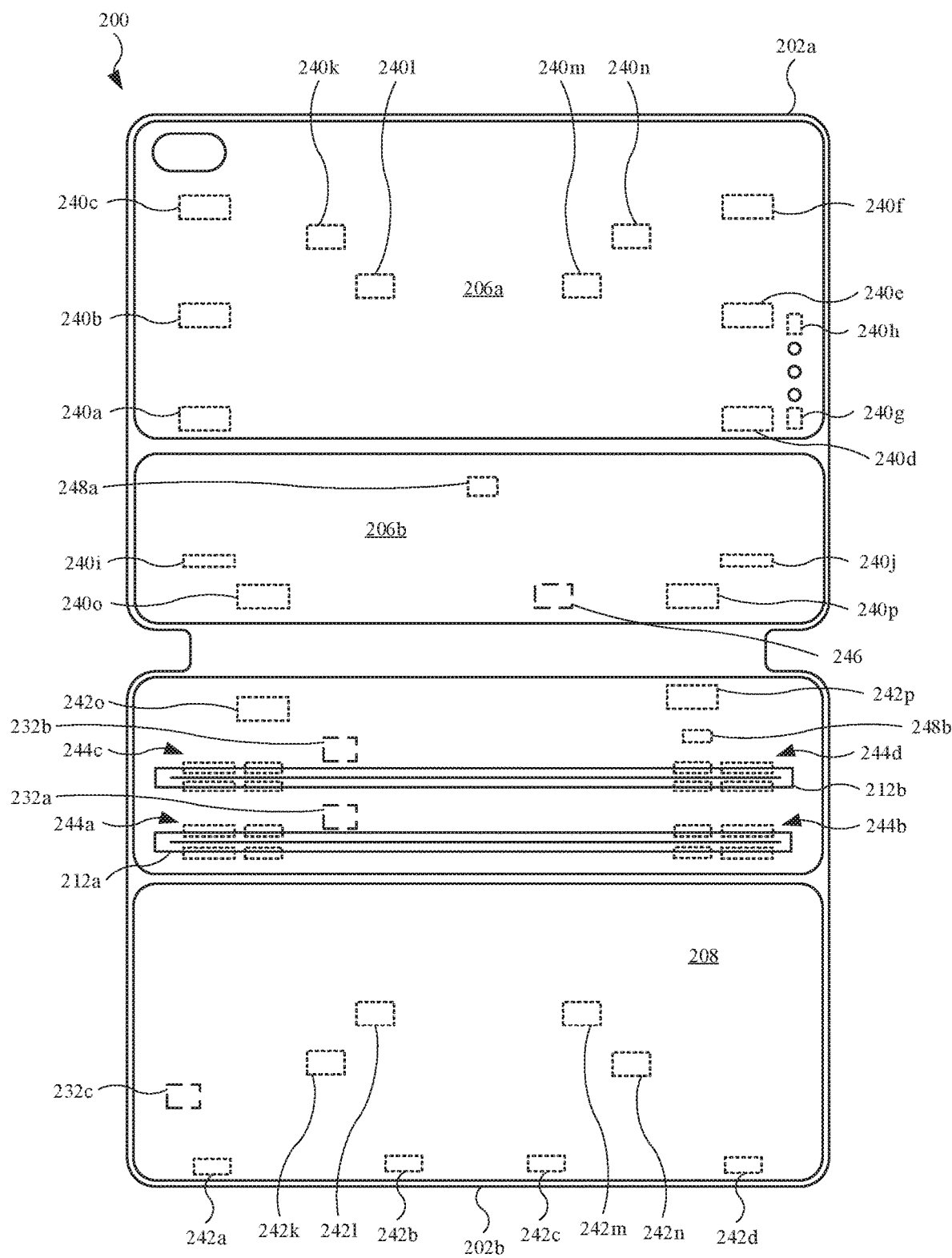
FIG. 6 illustrates a plan view of the accessory device shown in FIG. 5, showing various internal components of the accessory device.

FIG. 6 illustrates a plan view of the accessory device 200 shown in FIG. 5, showing various internal components of the accessory device 200. For purposes of illustration, the keys of the keyboard 208 (shown in FIG. 5) are removed. The first section 202a and the second section 202b may include several magnetic elements. Also, the magnetic elements located in the first section 202a may be referred to as cover magnetic elements or cover magnets, as the first section 202a may be referred to as a cover or a cover section. Also, the magnetic elements located in the second section 202b may be referred to as keyboard magnetic elements or keyboard magnets, as the second section 202b may be referred to as a keyboard or keyboard section.

The first segment 206a of the first section 202a may include several magnetic elements designed to magnetically couple with magnetic elements in the electronic device 100 (shown in FIG. 2) to retain the electronic device 100 against the first section 202a. For example, the first segment 206a may include magnetic elements 240a, magnetic elements 240b, and magnetic elements 240c. The magnetic elements described herein for the accessory device 200 may be represented by a rectangular structure. However, the magnetic elements include a layout/arrangement similar to that of the magnetic elements shown in FIG. 3 for the electronic device 100, in terms of the number of rows and/or columns, as well as the number of discrete magnetic elements. For example, the magnetic elements 240a may include a layout/arrangement similar to the magnetic elements 140a. However, the polarity of the discrete magnetic elements of the magnetic elements 240a may be reversed in order to form several magnetic circuits (with a magnetically attractable North-South pair) between the magnetic elements 240a and the magnetic elements 140a.

The first segment 206a may further include magnetic elements 240d, magnetic elements 240e, and magnetic elements 240f. At least some of the magnetic elements 240a, the magnetic elements 240b, and the magnetic elements 240c may magnetically couple with at least some of the magnetic elements 140a, the magnetic elements 140b, and the magnetic elements 140c (shown in FIG. 3). Further, at least some of the magnetic elements 240d, the magnetic elements 240e, and the magnetic elements 240f may magnetically couple with at least some of the magnetic elements 140d, the magnetic elements 140e, and the magnetic elements 140f (shown in FIG. 3). These aforementioned magnetic coupling provide the magnetic attraction force for the large-scale alignment to align the corners of the electronic device 100 (shown in FIG. 5) with the corners of the first section 202a. The first section 202a may further include magnetic elements 240g and magnetic elements 240h capable of magnetically coupling with the magnetic elements 140g and the magnetic elements 140h (shown in FIG. 3), respectively. This may provide the small-scale alignment to align and engage the electrical contacts 214 with the electrical contacts 123 of the electronic device 100 (shown in FIG. 3). The first section 202a may further include magnetic elements 240i and magnetic elements 240j designed to magnetic couple with magnets in the electronic device 100 (shown in FIG. 3), such as the magnetic elements 140c and the magnetic elements 140f (shown in FIG. 3).

The first section 202a and the second section 202b are designed to engage each other, and remain engaged through magnetic coupling. For example, the first section 202a may include magnetic elements 240k, magnetic elements 240l, magnetic elements 240m, and magnetic elements 240n are designed to magnetically couple with magnetic elements 242k, magnetic elements 242l, magnetic elements 242m, and magnetic elements 242n, respectively, located in the second section 202b. For instance, when the first section 202a is rotated such that a back surface (not shown in FIG. 6) of the first section 202a engages a back section (not shown in FIG. 6) of the second section 202b, the aforementioned magnetic elements magnetically couple such that the back surfaces remain engaged with each other. To further retain the back surfaces with each other, the first section 202a may include magnetic elements 240o and magnetic elements 240p (located in the second segment 206b) designed to magnetically couple with magnetic elements 242o and magnetic elements 242p (located in the second segment 206b), respectively.

The magnetic elements in the first segment 206a (and in some cases, the first segment 206a and the second segment 206b) can (collectively) retain the electronic device 100 (shown in FIG. 5) against the first section 202a by magnetic attraction, even overcoming gravitational forces acting on the electronic device 100. In this regard, the first section 202a may not require mechanical retaining features, such as sidewalls and/or locks, designed to wrap around and/or interlock with the electronic device 100 to retain the electronic device 100.

In some embodiments, the first segment 206a is the same size (or at approximately the same size) as that of the second segment 206b. In the embodiment shown in FIG. 6, the size of the first segment 206a is different from the size of the second segment 206b. This may facilitate positioning the first section 202a in a desired manner to support the electronic device 100. This will be shown and described below.

The second section 202b may further include magnetic elements along an edge (of the second section 202b). For example, the second section 202b may include magnetic elements 242a, magnetic elements 242b, magnetic elements 242c, and magnetic elements 242d. These magnetic elements are designed to magnetically couple with magnetic elements (or magnetically attractable materials) in the electronic device 100 (shown in FIG. 3) in order to retain the electronic device 100 with the second section 202b along the edge.

The second section 202b may include additional magnetic elements. For example, the second section 202b may include a magnetic assembly 244a and a magnetic assembly 244b (both shown as dotted lines), with each magnetic assembly including two or more magnetic elements positioned around the first channel 212a. The magnetic assembly 244a and the magnetic assembly 244b are designed to magnetically couple with magnetic elements, or magnetically attractable materials, in the electronic device 100 (not shown in FIG. 6) in order to retain a portion of the electronic device 100 within the first channel 212a. The second section 202b may further include a magnetic assembly 244c and a magnetic assembly 244d (both shown as dotted lines), with each magnetic assembly including two or more magnetic elements positioned around the second channel 212b. The magnetic assembly 244c and the magnetic assembly 244d are designed to magnetically couple with magnetic elements, or magnetically attractable materials, in the electronic device 100 (not shown in FIG. 6) in order to retain a portion of the electronic device 100 within the second channel 212b. Each of the magnetic assembly 244a, the magnetic assembly 244b, the magnetic assembly 244c, and the magnetic assembly 244d may form a Halbach array designed to provide an additive or increased external magnetic field at one location, while providing a resultant decreased external magnetic field at another location. The additive or increased external magnetic field may pass through the first channel 212a and the second channel 212b to enhance the magnetic attraction force between magnets in the electronic device 100 and the aforementioned magnetic assemblies. That may provide allow fewer magnetic elements along the first channel 212a and the second channel 212b, which may result in less weight and less cost.

It may be advantageous to selectively activate or deactivate the keyboard 208 based upon the position of the electronic device 100 (not shown in FIG. 6) relative to the accessory device 200. In this regard, the accessory device 200 may include sensors designed to detect an external magnetic field generated from magnetic elements in the electronic device 100 to determine the position of the electronic device 100. For example, the accessory device 200 may include a first sensor 232a and a second sensor 232b. The first sensor 232a and the second sensor 232b are designed to detect when the electronic device 100 is positioned in the first channel 212a and the second channel 212b, respectively, and provide an input that activates the electronic device 100. In some embodiments, the first sensor 232a and the second sensor 232b are Hall Effect sensors designed to detect an external magnetic field generated by magnetic elements in the electronic device 100. The accessory device 200 may include a third sensor 232c designed to detect when the electronic device 100 lies flat over the keyboard 208, and provide an input that deactivates the electronic device 100.

Referring again to FIG. 3, the electronic device 100 may include a compass 146. When the electronic device 100 is positioned on the first section 202a (in FIG. 6), at least some of the magnetic elements may provide an interfering external magnetic field that causes the compass 146 to inaccurately determine the Earth's magnetic field, and as a result, in inaccurately determine the proper direction (such as North, South, East, or West). FIG. 6 shows a location 246 of the compass 146 superimposed on the first section 202a. In order to offset or neutralize any magnetic elements that may affect the compass 146, the accessory device 200 may include a first compensating magnetic element 248a and a second compensating magnetic element 248b. The first compensating magnetic element 248a and the second compensating magnetic element 248b may be modified to provide an external magnetic field (not shown in FIG. 6) that is non-normal or non-perpendicular with respect to surfaces defined by the first section 202a and the second section 202b (as positioned in FIG. 6), whereas the magnetic elements in the accessory device 200 may provide an external magnetic field (not shown in FIG. 6) that is generally normal or perpendicular with respect to surfaces defined by the first section 202a and the second section 202b. As a result, the first compensating magnetic element 248a and the second compensating magnetic element 248b may offset external magnetic fields of the magnetic elements in the accessory device 200 such that the compass 146 works properly. The first compensating magnetic element 248a and the second compensating magnetic element 248b are shown in the first section 202a and the second section 202b, respectively. However, other locations are possible.

Figure 7:
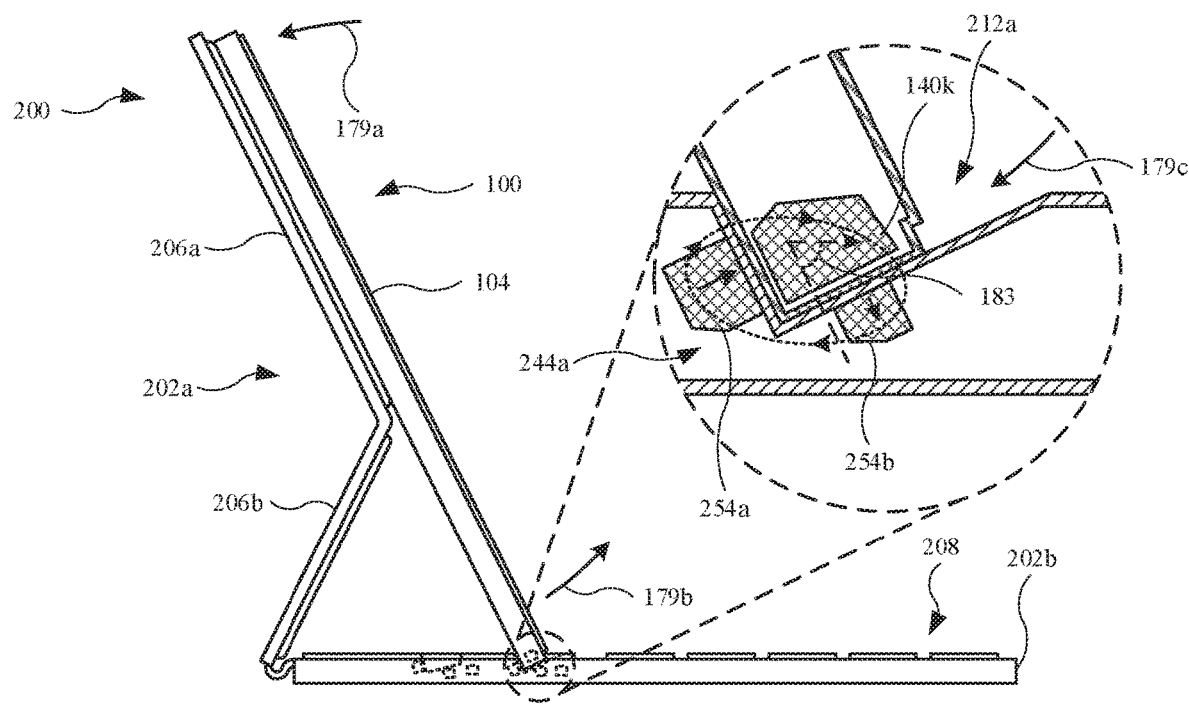
FIG. 7 illustrates a side view of the accessory device shown in FIG. 6, showing the electronic device coupled to the accessory device and positioned in the first channel, in accordance with some described embodiments.

FIG. 7 illustrates a side view of the accessory device 300 shown in FIG. 6, showing the electronic device 100 coupled to the accessory device 200 and positioned in the first channel 212a, in accordance with some described embodiments. As shown, the magnetic elements 140k are magnetically coupled with a first magnet 254a and a second magnet 254b of the magnetic assembly 244a (also shown in FIG. 6). When a force (in the direction of an arrow 179a) is applied to the electronic device 100, a rotational force (in the direction of the arrow 179b) may cause the electronic device 100 to leave the first channel 212a. However, the magnetic assembly 244a may counter the rotational force. For example, the first magnet 254a may include a size and shape that is greater than that of the second magnet 254b. In this manner, the first magnet 254a may include a stronger external magnetic field as compared to that of the second magnet 254b. The relatively stronger external magnetic field of the first magnet 254a provides a force in the direction of an arrow 179c that is opposite to the force in the direction of the arrow 179b, thereby counteracting the rotational force. Also, the magnetic coupling between the magnetic elements 140k and the second magnet 254b provides a force in the direction, or at least approximately in the direction, of gravity to maintain the electronic device 100 in the first channel 212a. It should be noted that the magnetic assembly 244b (shown in FIG. 6) may include a number of magnets and associated features described for the magnetic assembly 244a. Furthermore, the magnetic elements 140l (shown in FIG. 3) may magnetically couple with the magnetic assembly 244b.

As described in FIG. 6, the magnetic assemblies (such as the magnetic assembly 244a) may form a Halbach array to enhance the magnetic attraction force. The electronic device 100 may include modified magnetic elements to further enhance the magnetic attraction force. For example, the first magnet 254a and the second magnet 254b are polarized such that the magnetic field is normal relative to a surface of the first magnet 254a and the second magnet 254b, as indicated by arrows superimposed on the first magnet 254a and the second magnet 254b. However, the magnetic elements 140k may be polarized to include some non-normal angle respect to a surface of a magnetic element of the magnetic elements 140k. As shown, an arrow superimposed on the magnetic elements 140k indicates the magnetic field is at an angle 183 that is non-normal with respect to a surface of the magnetic elements 140k. In some embodiments, the angle 183 is 40 degrees. Generally, the angle 183 may be in the range of 30 to 80 degrees.

Figure 8:
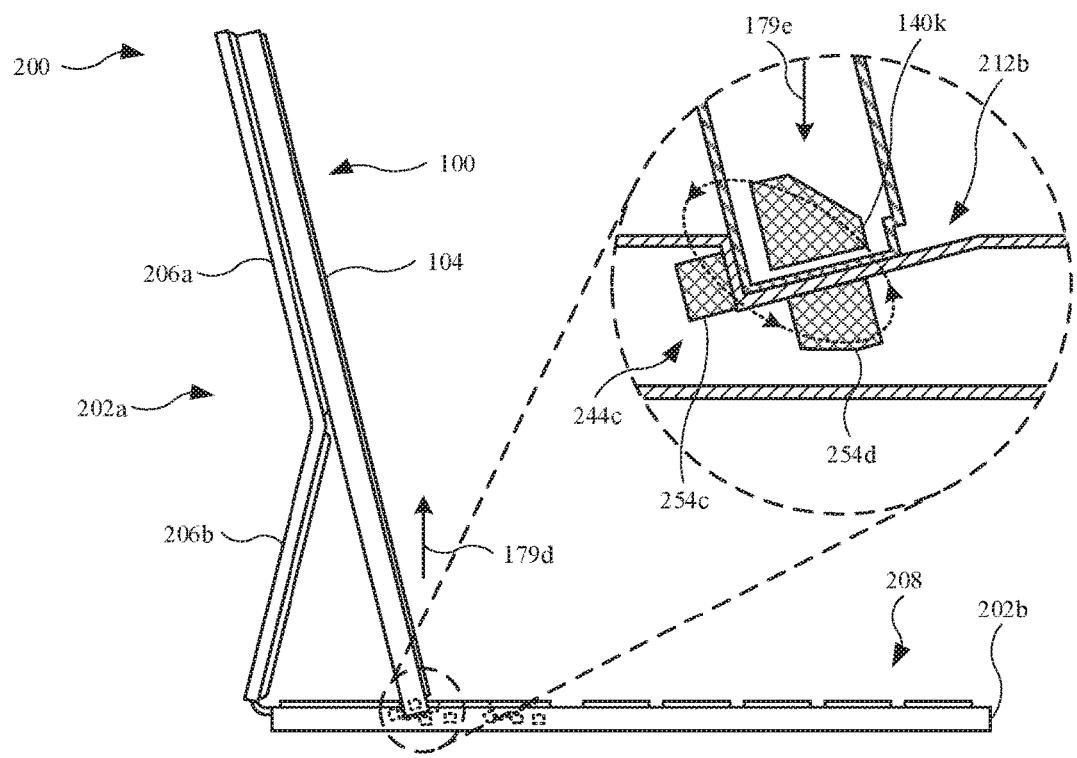
FIG. 8 illustrates a side view of the accessory device shown in FIG. 6, showing the electronic device positioned in the second channel.

FIG. 8 illustrates a side view of the accessory device 200 shown in FIG. 6, showing the electronic device 100 positioned in the second channel 212b. As shown, the magnetic elements 140k are magnetically coupled with a first magnet 254c and a second magnet 254d of the magnetic assembly 244c. When a force (in the direction of an arrow 179d) is applied to the electronic device 100, the electronic device 100 may be lifted out of the second channel 212b and away from the second section 202b. However, the magnetic assembly 244c may counter the force. For example, the second magnet 254d may include a size and shape that is greater than that of the first magnet 254c. In this manner, the second magnet 254d may include a stronger external magnetic field as compared to that of the first magnet 254c. The relatively stronger external magnetic field of the second magnet 254d provides a force in the direction of an arrow 179e that is opposite to the force in the direction of the arrow 179d, thereby counteracting the force. Also, the magnetic coupling between the magnetic elements 140k in the electronic device 100 and the first magnet 254c provides a force to maintain the electronic device 100 in the second channel 212b. It should be noted that the magnetic assembly 244d (shown in FIG. 3) may include a number of magnets and associated features described for the magnetic assembly 244c. Furthermore, the magnetic elements 140l (shown in FIG. 3) may magnetically couple with the magnetic assembly 244d.

FIGS. 7 and 8 show the first section 202a supporting the electronic device 100 in an upright configuration such that a user can interact with both the keyboard 208 and the display assembly 104. Further, the disparate size between the first segment 206a and the second segment 206b (that is, the first segment 206a being larger than the second segment 206b) allows the first section 202a to adjust, thereby allowing the electronic device 100 to be positioned in the first channel 212a and the second channel 212b.

Figure 9:
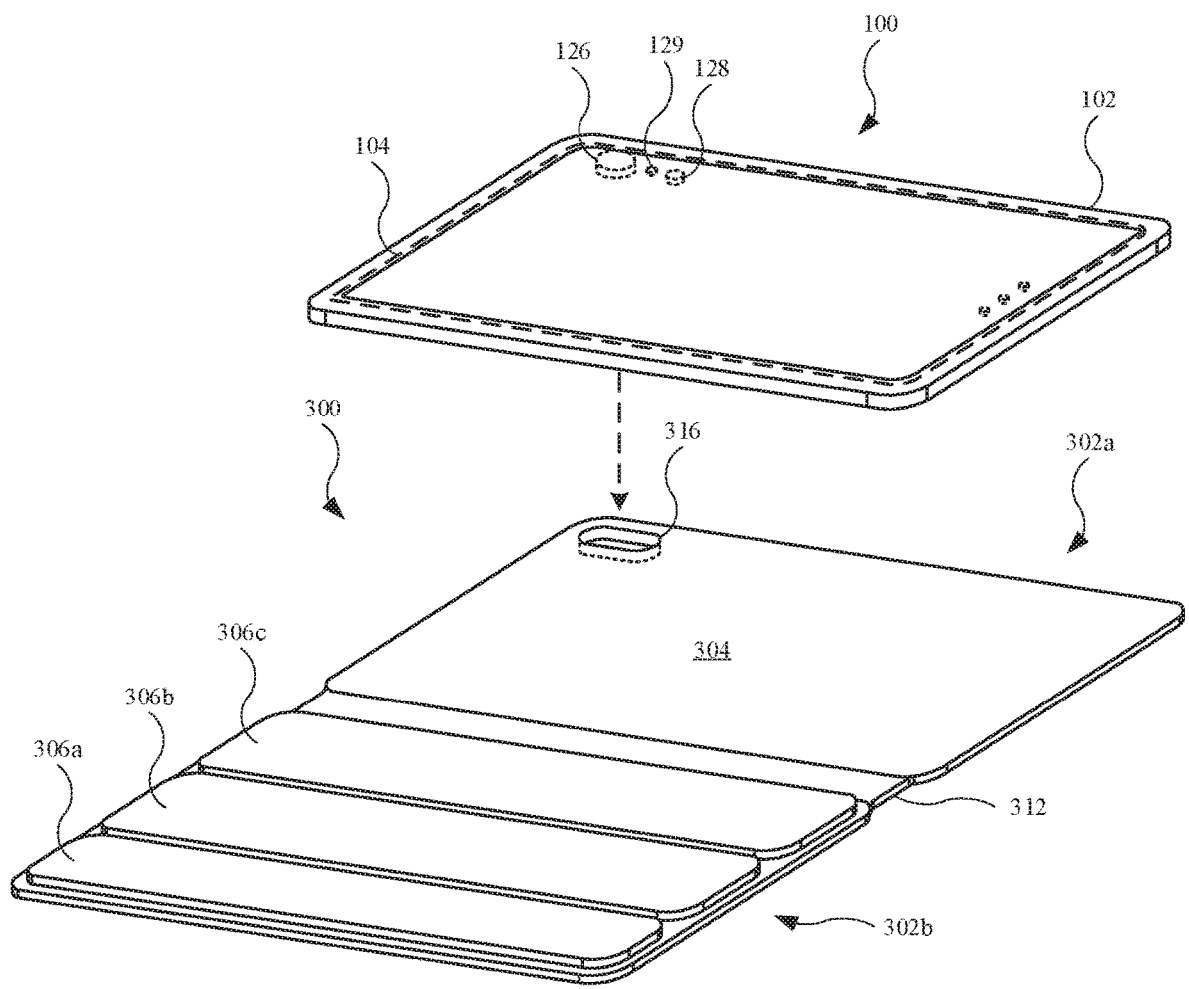
FIG. 9 illustrates an isometric view of an alternate embodiment of an accessory device, in accordance with some described embodiments.

FIG. 9 illustrates an isometric view of an alternate embodiment of an accessory device 300, in accordance with some described embodiments. The accessory device 300 is designed for use with an electronic device 100, including portable electronic devices such as mobile wireless communication devices and tablet computer devices. In this regard, the accessory device 300 may be referred to as a case, a cover, a protective cover, a protective case, a folio, or the like.

As shown, the accessory device 300 may include a first section 302a coupled to a second section 302b. The first section 302a may define a back cover or back panel for the electronic device 100. The first section 302a may define a receiving surface 304 that receives the electronic device 100, and in particular, the enclosure 102. In this regard, the first section 302a may retain the electronic device 100 one or more magnets. This will be shown and discussed below. The first section 302a may further include an opening 316, or through hole, designed to receive the camera assembly 126, the flash module 128, and the microphone 129.

The second section 302b is designed to wrap around and cover the electronic device 100, including the display assembly 104. In this manner, the second section 302b may be referred to as a front panel or front cover. The second section 302b may include multiple segments. For example, the second section 302b may include a first segment 306a, a second segment 306b, and a third segment 306c. Each segment is rotatable or moveable with respect to the remaining segments. Also, while a discrete number of segments may vary in other embodiments.

The second section 302b is coupled to the first section 302a by a hinge 312 such that the first section 302a is rotatable with respect to the second section 302b, and vice versa. The hinge 312 may be formed in part by one more continuous pieces of material that extend(s) along the first section 302a and the second section 302b. The materials that form the layer(s) may include polymers, such as polyurethane, that wrap around a fiberglass material. However, in order to promote flexibility and relative movement of the aforementioned sections and segments, the fiberglass material (and/or other relatively rigid or stiff materials) may not be located at the hinge 312 and in locations between the segments. This will be shown and described below. Also, a soft, non-abrasive material, such as microfiber, may cover the first segment 306a, the second segment 306b, and the third segment 306c. In this manner, when the second section 302b wraps around and covers the display assembly 104 (which may include transparent cover overlaying the display assembly 104), the soft, non-abrasive materials do not cause damage when in contact with the transparent cover or the display assembly 104.

Figure 10:
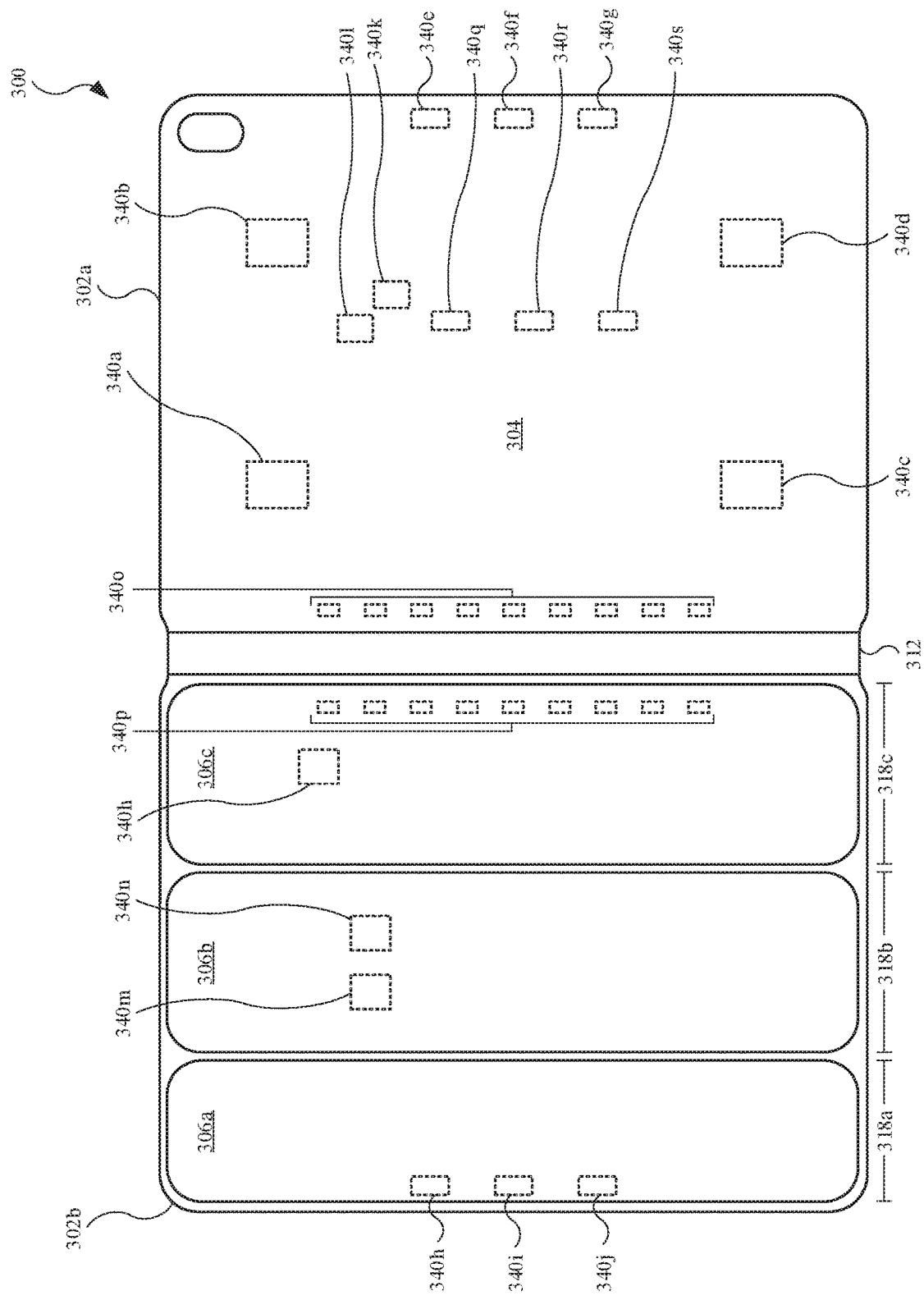
FIG. 10 illustrates a plan view of the accessory device shown in FIG. 9, showing additional features in the accessory device.

FIG. 10 illustrates a plan view of the accessory device 300 shown in FIG. 9, showing additional features in the accessory device. As shown, the accessory device 300 may include magnetic elements 340a, magnetic elements 340b, magnetic elements 340c, and magnetic elements 340d. The magnetic elements 340a, the magnetic elements 340b, the magnetic elements 340c, and the magnetic elements 340d are designed to magnetically couple with magnets in the electronic device 100 (shown in FIG. 3) to retain the electronic device 100 with the receiving surface 304. As a result, the first section 302a may not require mechanical features (such as retaining walls, sidewalls, or mechanical interlocks) to retain the electronic device 100. The magnetic elements described herein for the accessory device 300 may be represented by a rectangular structure. However, the magnetic elements include a layout/arrangement similar to that of the magnetic elements shown in FIG. 3 for the electronic device 100, in terms of the number of rows and/or columns, as well as the number of discrete magnetic elements. For example, the magnetic elements 340a may include a layout/arrangement similar to the magnetic elements 140a or the magnetic elements 140c. However, the polarity of the discrete magnetic elements of the magnetic elements 340a may be reversed in order to form several magnetic circuits (with a magnetically attractable North-South pair) between the magnetic elements 340a and the magnetic elements 140a.

The accessory device 300 may further include magnetic elements 340e, magnetic elements 340f, and magnetic elements 340g in the first section 302a that are designed to magnetically couple with magnetic elements 340h, magnetic elements 340i, and magnetic elements 340j, respectively, in the second section 302b. These magnetic couplings may occur when, for example, the second section 302b is rotated over and onto the receiving surface 304 or when a back surface (not shown in FIG. 10) of the second section 302b is rotated over and onto a back surface (not shown in FIG. 10) of the first section 302a via the hinge 312, with the back surface of the first section 302a being opposite the receiving surface 304.

The accessory device 300 may further include magnetic elements 340k and magnetic elements 340l located in the first section 302a that are designed to magnetically couple with magnetic elements 340m and magnetic elements 340n, respectively, located in the second section 302b, and in particular, the second segment 306b. The magnetic elements 340m and the magnetic elements 340n are parallel (or aligned) with each other, while the magnetic elements 340k are offset (or misaligned) with respect to the magnetic elements 340l. Also, the magnetic elements 340k and the magnetic elements 340l are offset with respect to the magnetic elements 340m and the magnetic elements 340n, respectively. However, the degree of offset between the magnetic elements 340k and the magnetic elements 340m may differ from that of the magnetic elements 340l and the magnetic elements 340n. In this manner, when the back surface of the second section 302b is positioned against the back surface of the first section 302a, the magnetic attraction between the magnetic elements 340k and the magnetic elements 340m may differ from the magnetic attraction between the magnetic elements 340k and the magnetic elements 340m. For example, the magnetic attraction between the magnetic elements 340k and the magnetic elements 340m may be greater than the magnetic attraction between the magnetic elements 340k and the magnetic elements 340m. As a result, when the magnetic elements 340k are no longer coupled to the magnetic elements 340m, the magnetic elements 340l are no longer coupled to the magnetic elements 340n. This may be part of a comprehensive process in that when the first segment 306a is pulled away from the back surface of the first section 302a, the second segment 306b and the third segment 306c are subsequently pulled away from the back surface of the first section 302a without any additional force required other than to pull the first segment 306a away from the back surface of the first section 302a. In other words, when the first segment 306a is removed from the back surface, the second segment 306b and the third segment 306c may automatically fall away from the back surface.

The accessory device 300 may further include magnetic elements 340o located in the first section 302a that are designed to magnetically couple with magnetic elements 340p located in the second section 302b, and in particular, the third segment 306c. When the back surface of the second section 302b is positioned against the back surface of the first section 302a, the magnetic elements 340o magnetically couple with magnetic elements 340p. Further, while the back surface of the second section 302b is rotated over and onto the back surface of the first section 302a, the magnetic elements 340p magnetically couple with the that magnetic elements 340o prior to the back surface of the second section 302b being fully positioned on the back surface. The magnetic coupling can provide a magnetic attraction force that pulls the second section 302b in a manner that aligns the back surface of the second section 302b with the back surface of the first section 302a to prevent misalignment between the back surface of the second section 302b and the back surface of the first section 302a. In words, the second section 302b will not be crooked with respect to the first section 302a as a result of the magnetic coupling between the magnetic elements 340o and the magnetic elements 340p.

As noted above, some magnetic elements shown and described in FIG. 10 that are represented by a rectangle may include several discrete magnetic elements. By using several, smaller discrete magnetic elements, as opposed to using fewer, but larger magnetic elements, the ease of aligning the electronic device 100 (shown in FIG. 9) with the first section 302a increases. For example, each magnetic element provides a relatively small external magnetic field, thereby reducing the magnetic attraction force during alignment. However, the magnetic elements, as a group (such as the cluster of the magnetic elements 340a), may provide a similar collective external magnetic field as that of a single, larger magnetic element. The group of magnetic elements allows more movement as compared to a large, single magnet, thereby enhancing the alignment process.

The accessory device 300 may include certain dimensional characteristics. For example, the first segment 306a may include a dimension 318a that is less than a dimension 318b of the second segment 306b and less than a dimension 318c of the third segment 306c. Further, the dimension 318b of the second segment 306b can be the same as, or at least substantially similar, to the dimension 318c of the third segment 306c. However, other dimensional relationships of the first segment 306a, the second segment 306b, and/or the third segment 306c are possible.

Additionally, the accessory device 300 may include magnetic elements 340q, magnetic elements 340r, and magnetic elements 340s embedded in the first section 302a. In some instances, when the first segment 306a is engaged with the second segment 306b, the magnetic elements 340h, the magnetic elements 340i, and the magnetic elements 340j can magnetically couple with the magnetic elements 340q, the magnetic elements 340r, and the magnetic elements 340s, respectively.

Figure 11:
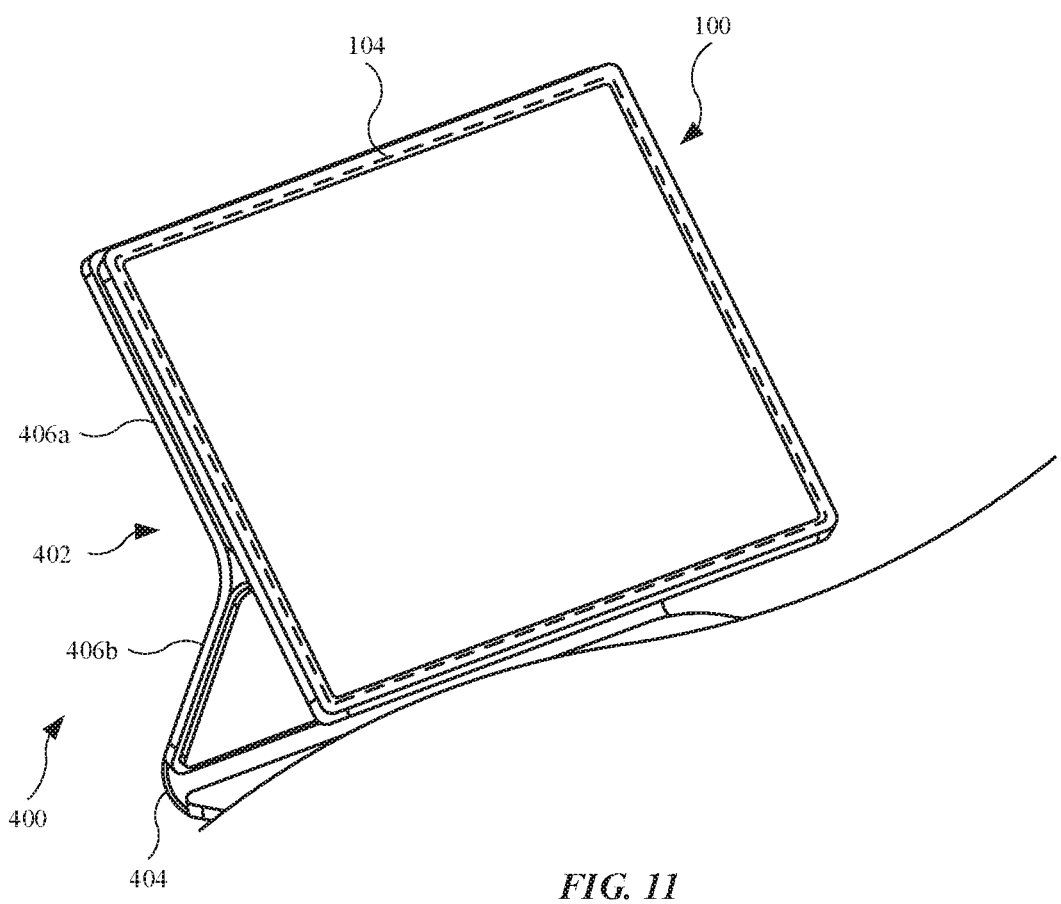
FIG. 11 illustrates an isometric view of an alternate embodiment of an accessory device, in accordance with some described embodiments.

FIG. 11 illustrates an isometric view of an alternate embodiment of an accessory device 400, in accordance with some described embodiments. The accessory device 400 is designed as a complementary device for an electronic device 100. In this regard, the accessory device 400 may include a protective cover, a protective case, a folio, or the like. As shown, the accessory device 400 may include a section 402. Although partially shown, the accessory device 400 may further include an additional section (similar to the second section 202b, shown in FIG. 5) that is connected to the section 402. The accessory device 400 may include a hinge 404 that connects the section 402 with the aforementioned additional section. The hinge 404 allows the section 402 to rotate or pivot with respect to the aforementioned additional section, and vice versa. The hinge 404 may include a flexible material (such as polyurethane, as a non-limiting example) that defines an outer layer (or layers) extending across the accessory device 400.

The section 402, also referred to as a first section, a cover, a cover portion, a cover section, an electronic device cover, or a segmented cover, may define a receiving surface for the electronic device 100. The section 402 may include a first segment 406a rotationally coupled to a second segment 406b by several embedded hinges (not shown in FIG. 11) positioned between the first segment 406a and the second segment 406b. The embedded hinges allow rotational movement of the first segment 406a relative to the second segment 406b, and vice versa. The embedded hinges support the section 402 to hold the electronic device 100. Further, in some instances, the embedded hinges allow the section 402 to hold and suspend the electronic device 100 such that the electronic device 100 is suspended from, and not in contact with, the aforementioned additional section. Although a particular position (of the section 402) is shown, the section 402 can rotate and re-position the electronic device 100, whether the electronic device 100 is in contact, or is not in contact, with the aforementioned additional section. Also, in order to hold the electronic device 100, the first segment 406a may include several magnetic elements (not shown in FIG. 11). The first segment 406a may include any arrangement of magnetic elements shown for the first segment 206a (shown in FIG. 6). Alternatively, the first segment 406a may include any arrangement of magnetic elements shown for the first segment 306a and the second segment 306b (shown in FIG. 10).

In some embodiments, the first segment 406a and the second segment 406b are the same size, generally. In the embodiment shown in FIG. 11, the first segment 406a is larger than the second segment 406b. Also, the first segment 406a and the second segment 406b may each include a microfiber layer (not labeled). In some instances, the microfiber layer is restricted to the first segment 406a and the second segment 406b such that the microfiber layer does not cover the embedded hinges.

The section 402 may further include electrical contacts (not shown in FIG. 11) designed to engage the electrical contacts 123 (shown in FIG. 3) of the electronic device 100, and place the accessory device 400 in communication (including electrical communication) with electronic device 100. The aforementioned additional section, also referred to as a keyboard section or a keyboard cover, may include a keyboard (not shown in FIG. 11) with several keys arranged in a QWERTY configuration, as a non-limiting example. When the accessory device 400 is in communication with the electronic device 100, the keyboard can be used to provide inputs and commands to the electronic device 100 to control the display assembly 104 (shown as a dotted line) of the electronic device 100. The section 402 may further include an opening (not shown in FIG. 11), or through hole, designed to receive the camera assembly 126, the flash module 128, and the microphone 129 (shown in FIG. 2).

Figure 12:
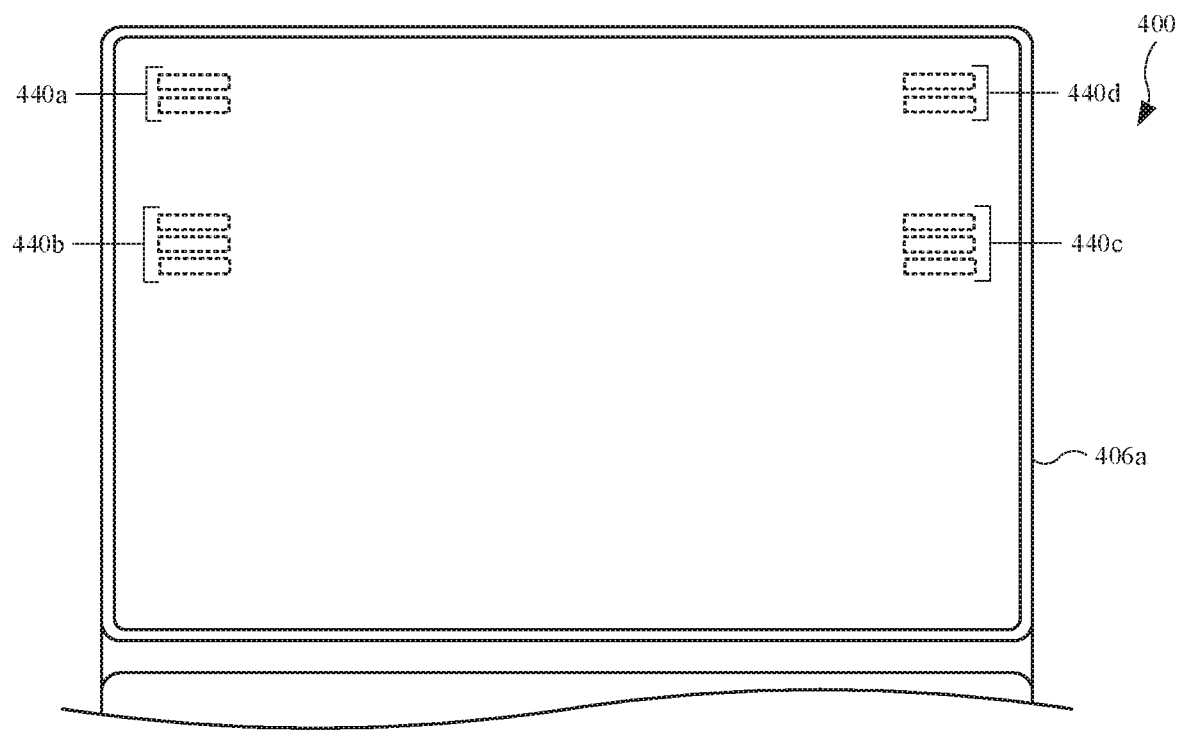
FIG. 12 illustrates a plan view of the accessory device shown in FIG. 11, showing several magnetic elements in the accessory device.

FIG. 12 illustrates a plan view of the accessory device 400 shown in FIG. 11, showing several magnetic elements in the accessory device 400. As shown, the first segment 406a may include magnetic elements 440a, magnetic elements 440b, magnetic elements 440c, and magnetic elements 440d. The magnetic elements described herein for the accessory device 400 may be represented by a rectangular structure. However, the magnetic elements include a layout/arrangement similar to that of the magnetic elements shown in FIG. 2 for the electronic device 100, in terms of the number of rows and/or columns, as well as the number of discrete magnetic elements. For example, the magnetic elements 440a may include a layout/arrangement similar to the magnetic elements 140c. In some instances, the polarity of the discrete magnetic elements of the magnetic elements 440a may be reversed in order to form several magnetic circuits (with a magnetically attractable North-South pair) between the magnetic elements 440a and the magnetic elements 140c. However, in some instances, the polarity of the discrete magnetic elements of the magnetic elements 440a is identical in order to magnetically repel (with a magnetically repulsive North-North or South-South pair) between the magnetic elements 440a and the magnetic elements 140c. This will be shown below.

Figure 13:
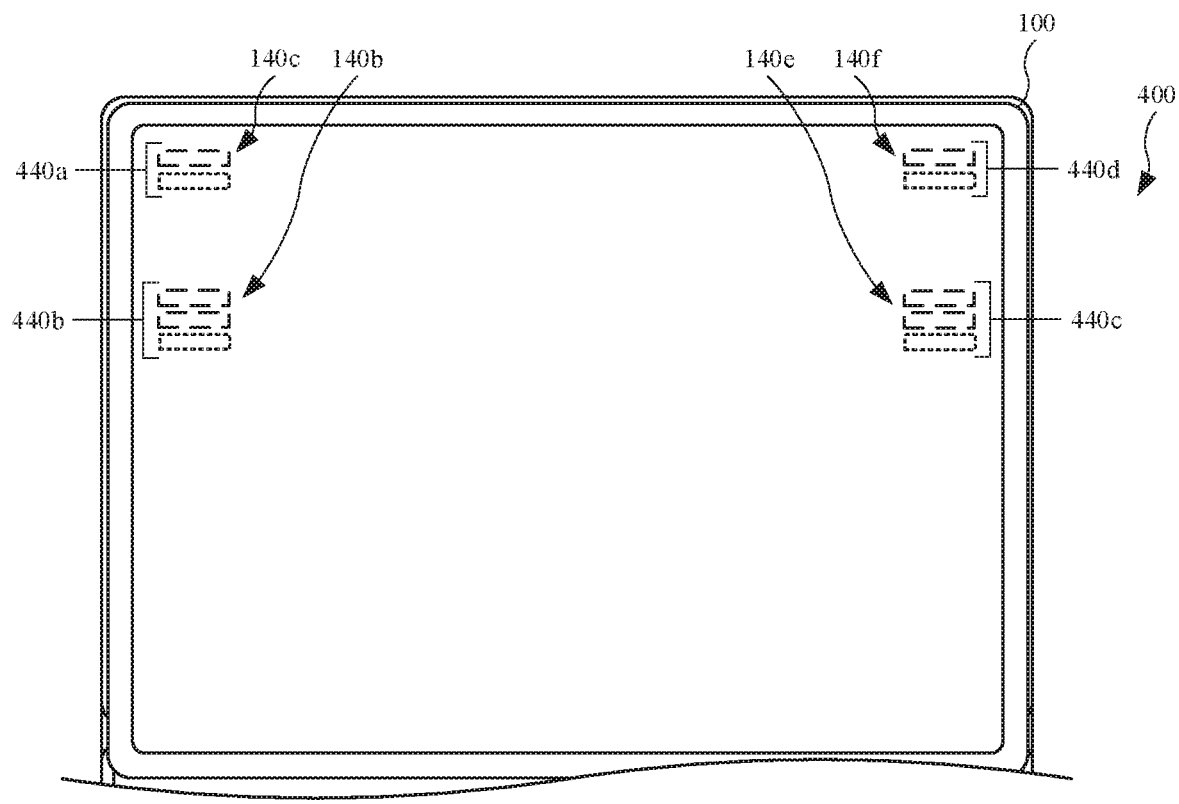
FIG. 13 illustrates a plan view of the accessory device shown in FIG. 12, showing the electronic device coupled to the accessory device.

FIG. 13 illustrates a plan view of the accessory device 400 shown in FIG. 12, showing the electronic device 100 coupled to the accessory device 400. As shown, at least some of the magnetic elements of the electronic device 100 align with magnetic elements of the accessory device 400. For example, some of the magnetic elements 140c, the magnetic elements 140b, the magnetic elements 140e, and the magnetic elements 140f (also shown in FIG. 3) of the electronic device 100 align with at some of the magnetic elements 440a, the magnetic elements 440b, the magnetic elements 440c, and the magnetic elements 440d, respectively, of the accessory device 400. These "aligning" magnetic elements may magnetically couple with each other in order to maintain the electronic device 100 with the accessory device 400. However, as shown, the magnetic elements 440a, the magnetic elements 440b, the magnetic elements 440c, and the magnetic elements 440d of the accessory device 400 include an additional array (in this case, an additional row) of magnetic elements, as compared to the magnetic elements 140c, the magnetic elements 140b, the magnetic elements 140e, and the magnetic elements 140f, respectively, of the electronic device 100. For example, the magnetic elements 140c and the magnetic elements 140b of the electronic device 100 include one array and two arrays, respectively, of magnetic elements, while the magnetic elements 440a and the magnetic elements 440b in the accessory device 400 include two arrays and three arrays, respectively, of magnetic elements. The additional array of magnetic elements in the accessory device 400 may provide a magnetic repulsion force to at least some of the magnetic elements in the electronic device 100.

Figure 14:
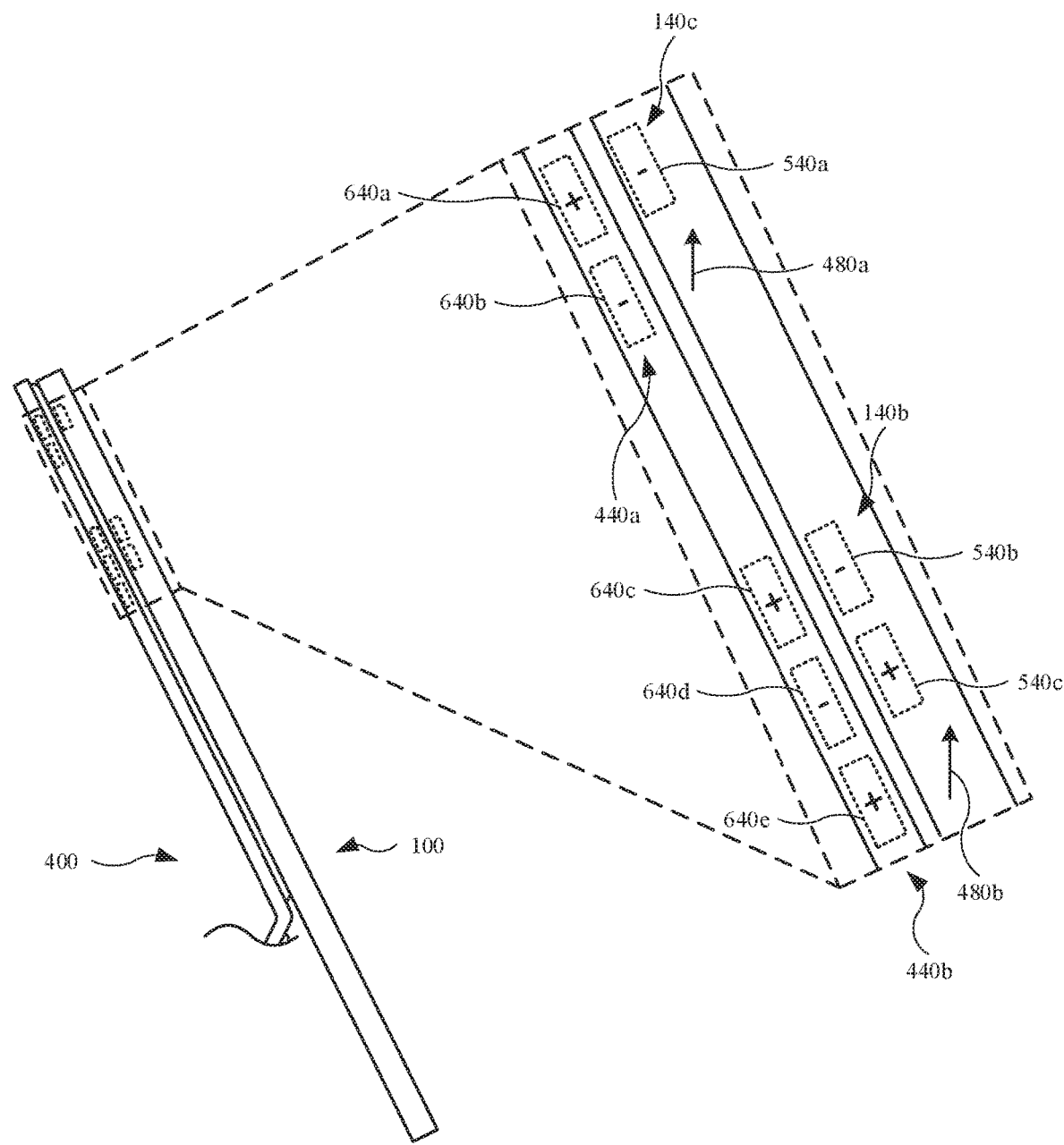
FIG. 14 illustrates a side view of the an accessory device and electronic device shown in FIG. 13, showing magnetic elements in the accessory device providing a magnetic repulsion force to magnetic elements in the electronic device.

FIG. 14 illustrates a side view of the an accessory device 400 and electronic device 100 shown in FIG. 13, showing magnetic elements in the accessory device 400 providing a magnetic repulsion force to magnetic elements in the electronic device 100. As shown in the enlarged view, the magnetic elements 140c includes a magnetic element 540a that is magnetically coupled with a magnetic element 640a of the magnetic elements 440a in the accessory device 400, as opposing magnetic poles are aligned. However, the magnetic elements 440a of the accessory device 400 further include a magnetic element 640b that magnetically repels the magnetic element 540a in the electronic device 100, as the same magnetic poles are aligned. The magnetic repulsion provides a force (generally against gravitational forces) in the direction of the arrow 480a, and provides an additional force that retains the electronic device 100 with the accessory device 400. It should be noted that the magnetic elements 440a include additional elements that magnetically couple with additional magnetic elements of the magnetic elements 140c (similar to the magnetic element 640a and the magnetic element 540a). Also, it should be noted that the magnetic elements 440a include additional elements that magnetically repel additional magnetic elements of the magnetic elements 140c (similar to the magnetic element 640b and the magnetic element 540a).

Also, the magnetic elements 140b includes a magnetic element 540b and a magnetic element 540c that is magnetically coupled with a magnetic element 640c and a magnetic element 640d, respectively, of the magnetic elements 440b in the accessory device 400, as opposing magnetic poles are aligned. However, the magnetic elements 440b of the accessory device 400 further include a magnetic element 640e that magnetically repels the magnetic element 540c in the electronic device 100, as the same magnetic poles are aligned. The magnetic repulsion provides a force (generally against gravitational forces) in the direction of the arrow 480b, and provides an additional force that retains the electronic device 100 with the accessory device 400. It should be noted that the magnetic elements 440b include additional elements that magnetically couple with additional magnetic elements of the magnetic elements 140b (similar to the magnetic element 640c and the magnetic element 540b). Also, it should be noted that the magnetic elements 440b include additional elements that magnetically repel additional magnetic elements of the magnetic elements 140b (similar to the magnetic element 640e and the magnetic element 540c). Although not shown, the described relationships between the magnetic elements 440d of the accessory device 400 and the magnetic elements 140f of the electronic device 100 (shown in FIG. 13) may be similar to those between the magnetic elements 440a and the magnetic elements 140c. Also, although not shown, the described relationships between the magnetic elements 440c of the accessory device 400 and the magnetic elements 140e of the electronic device 100 (shown in FIG. 13) may be similar to those between the magnetic elements 440b and the magnetic elements 140b.

Figure 15:
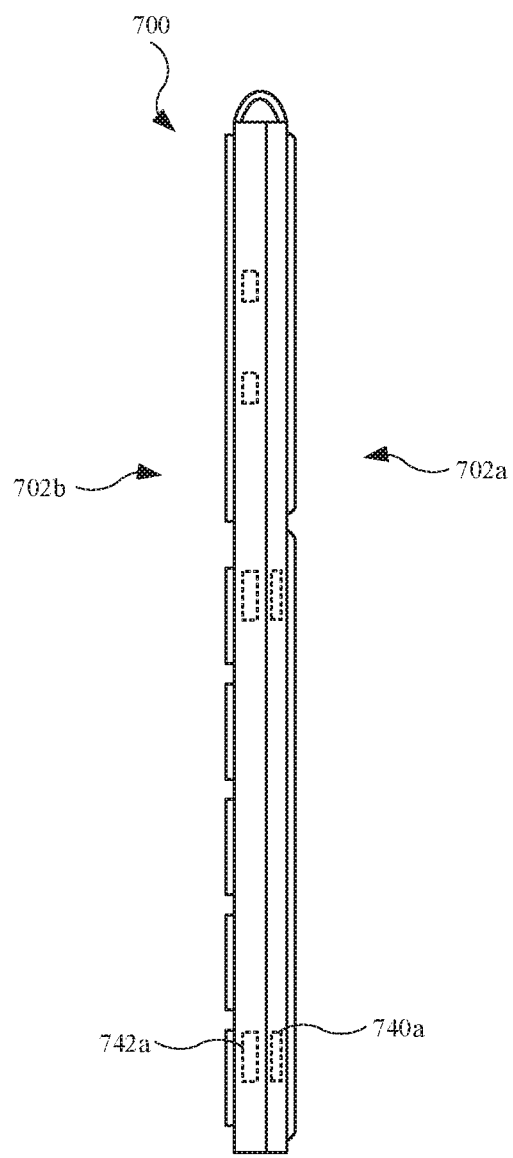
FIG. 15 illustrates a side view of the accessory device, showing back surfaces engaged with each other, in accordance with some described embodiments.
Figure 16:
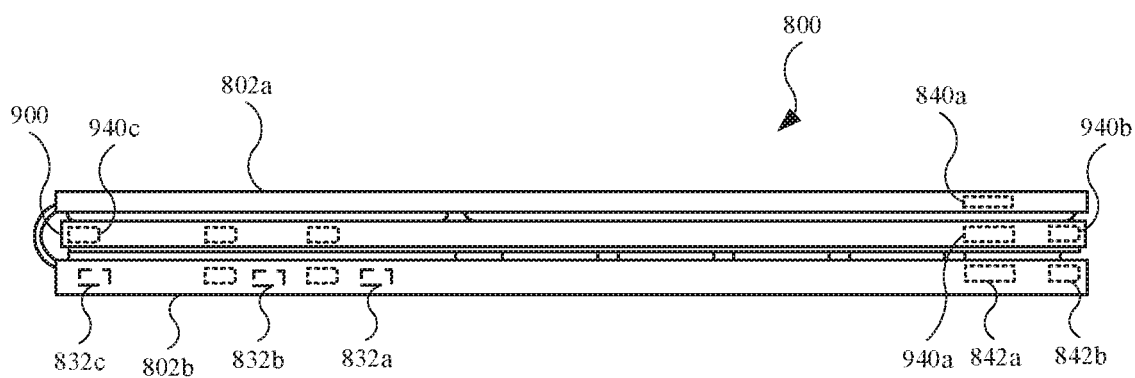
FIG. 16 illustrates a side view of an embodiment of an accessory device, showing an electronic device positioned between, and engaged with, a first section and a second section of the accessory device, in accordance with some described embodiments.
Figure 17:
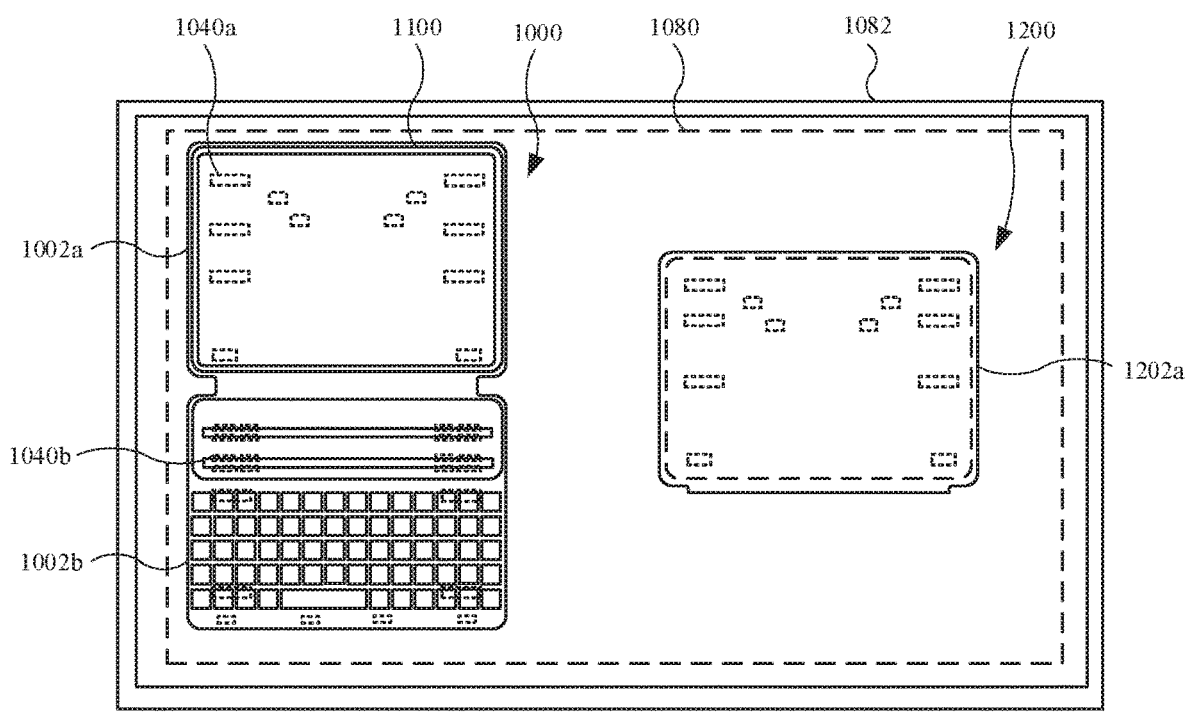
FIG. 17 illustrates accessory devices coupled with the electronic devices, showing the accessory devices engaged with, and suspended from, a magnetically attractable material using magnets in the accessory devices, in accordance with some described embodiments.

FIGS. 15-17 show and described various configurations for accessory devices. The accessory device 200 (shown in FIG. 5), the accessory device 300 (shown in FIG. 9), and the accessory device 400 (shown in FIG. 11) may be configured in at least some configurations shown in FIGS. 15-17. Also, the accessory devices shown and described in FIGS. 15-17 may include several features (including magnetic elements and arrangement of magnetic elements) described herein for the accessory device 200 (shown in FIG. 5), the accessory device 300 (shown in FIG. 9), and the accessory device 400 (shown in FIG. 11).

FIG. 15 illustrates a side view of the accessory device 700, showing back surfaces engaged with each other, in accordance with some described embodiments. As shown, the accessory device 700 includes a first section 702a and a second section 702b. A rear surface (or back surface) of the first section 702a is engaged with a rear surface (or back surface) of the second section 702b. The first section 702a can remain engaged with the second section 702b through magnet attraction. For example, the first section 702a includes a magnetic element 740a that magnetically couples with magnetic element 742a in the configuration of the accessory device 700 shown in FIG. 15. Additional magnetic elements (not labeled) in the first section 702a may magnetically couple with additional magnets (not labeled) in the second section 702b.

FIG. 16 illustrates a side view of an embodiment of an accessory device 800, showing an electronic device 900 positioned between, and engaged with, a first section 802a and a second section 802b of the accessory device 800, in accordance with some described embodiments. The electronic device 900 may include any features described herein for the electronic device 100 (shown in FIG. 1). In order to maintain the engagement, the electronic device 100 may magnetically couple with both the first section 802a and the second section 802b. For example, the electronic device 900 includes magnetic elements 940a magnetically coupled with both magnetic elements 840a in the first section 802a and magnetic elements 842a in the second section 802b. Furthermore, the electronic device 900 may include magnetic elements 940b magnetically coupled with magnetic elements 842b located along an edge of the second section 802b. The electronic device 900 may include additional magnetic elements (not shown in FIG. 16), with each additional magnet magnetically coupled with edge magnets of the accessory device 800 (similar to the magnetic elements 242a, the magnetic elements 242b, the magnetic elements 242c, and the magnetic elements 242d shown in FIG. 6).

Also, in the configuration shown in FIG. 16, a first sensor 832a and/or a second sensor 832b of the accessory device 800 may detect an external magnetic field generated from a magnet (or magnets) in the electronic device 900, thereby generating a subsequent command to activate a keyboard (not labeled), even though the keyboard is inaccessible. However, the accessory device 800 may include a third sensor 832c capable of detecting an external magnetic field from a magnetic element 940c. The third sensor 832c can send an input to a processor circuit on a circuit board of the electronic device 900 (not shown in FIG. 16) when the external magnetic field is detected. The processor circuit can then generate a command that deactivates the keyboard. In other words, an input from the third sensor 832c can override inputs from the first sensor 832a and the second sensor 832b. As a result, the accessory device 800 may initiate an inactive state of the electronic device 900 when the electronic device is covered and unusable, as shown in FIG. 16.

FIG. 17 illustrates accessory devices coupled with the electronic devices, showing the accessory devices engaged with, and suspended from, a magnetically attractable material 1080 using magnets in the accessory devices, in accordance with some described embodiments. The magnetically attractable material 1080 (shown as a dotted line) may be integrated with a chalkboard, a dry erase board, or refrigerator, as non-limiting examples. As shown, the magnetically attractable material 1080 is integrated with a dry erase board 1082 that is hung vertically.

As shown, an accessory device 1000 includes a sufficient number of magnetic elements (such as the magnetic elements 1040a and the magnetic elements 1040b) that generate (collectively) an external magnetic field that can magnetically couple with the magnetically attractable material 1080 and support the weight of and accessory device 1000 and the electronic device 1100 (coupled with the accessory device 1000 via magnetic elements), as well as counter the effects of gravity. In some instances, the magnetic elements in the first section 1002a alone provide an external magnetic field sufficient to support the weight of the accessory device 1000 and the electronic device 1100, as well as counter the effects of gravity. In some instances, the magnets in the second section 1002b alone provide an external magnetic field sufficient to support the weight of the accessory device 1000 and the electronic device 1100, as well as counter the effects of gravity. As shown, the accessory device 1000 is similar to the accessory device 200 (shown in FIG. 5). However, the accessory device 300 (shown in FIG. 9) and the accessory device 400 (shown in FIG. 11) may provide the same capabilities as those of the accessory device 1000.

Further, an accessory device 1200 may cover an electronic device (not shown in FIG. 17) and rely on magnetic elements (not labeled) in a single section (such as the section 1202a) to magnetically couple with the magnetically attractable material 1080 and remain suspended against gravity. As shown, the accessory device 1200 is similar to the accessory device 300 (shown in FIG. 9). However, the accessory device 200 (shown in FIG. 5) and the accessory device 400 (shown in FIG. 11) may provide the same capabilities as those of the accessory device 1000.

Figure 18:
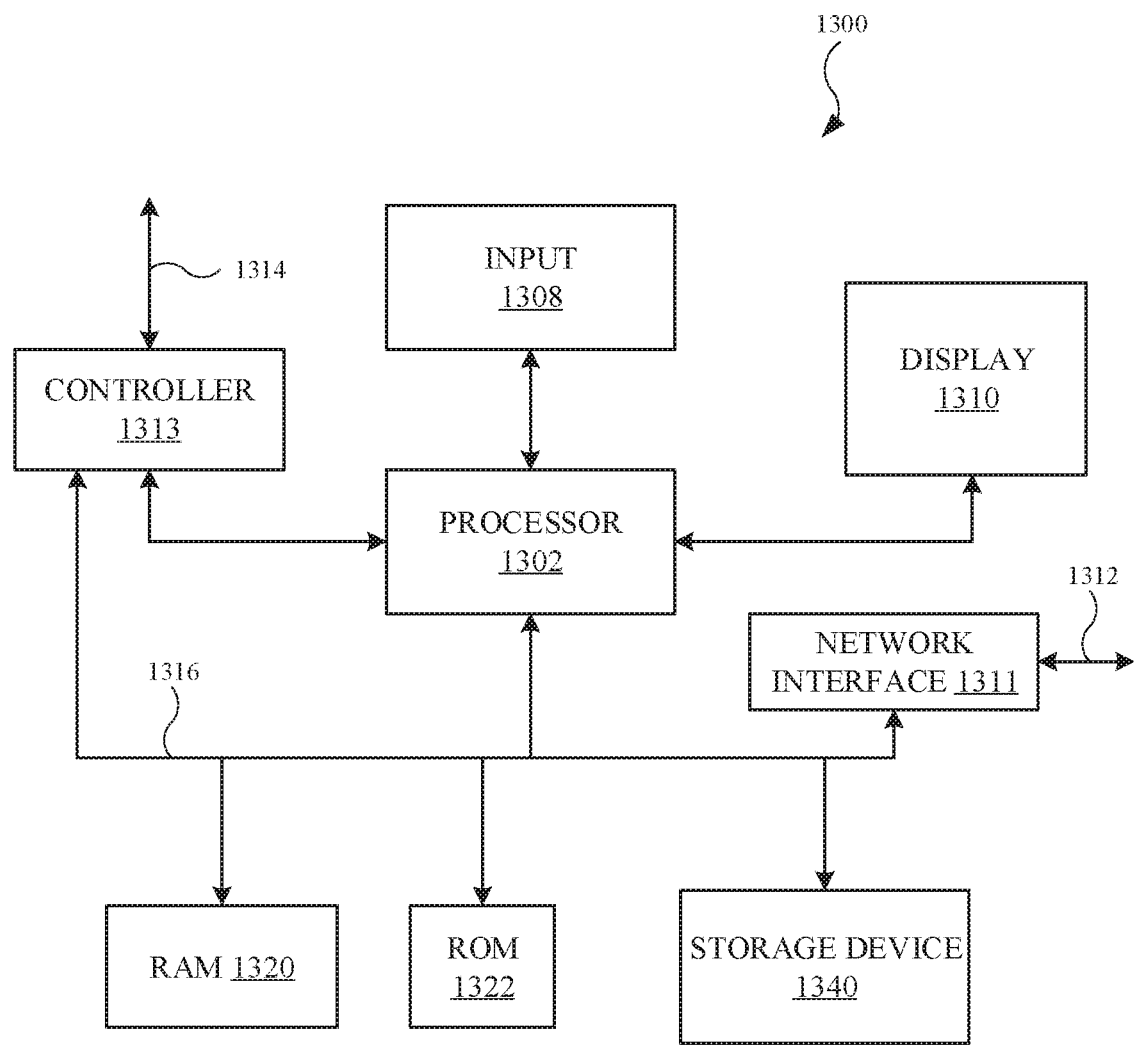
FIG. 18 illustrates a block diagram of an electronic device, in accordance with some described embodiments.

FIG. 18 illustrates a block diagram of an electronic device 1300, in accordance with some described embodiments. As least some components in the block diagram may be implemented in accessory devices described herein. In particular, the detailed view illustrates various components that can be included in the electronic device 100 illustrated in FIG. 1. Also, at least some components can be included in the accessory devices described herein.

As shown in FIG. 18, the electronic device 1300 can include a processor 1302 that represents a microprocessor or controller for controlling the overall operation of electronic device 1300. The electronic device 1300 can also include a user input device 1308 that allows a user of the electronic device 1300 to interact with the electronic device 1300. For example, the user input device 1308 can take a variety of forms, such as a button, keypad, dial, touch screen, audio input interface, visual/image capture input interface, input in the form of sensor data, etc. Still further, the electronic device 1300 can include a display 1310 (screen display) that can be controlled by the processor 1302 to present visual information to the user. A data bus 1316 can facilitate data transfer between at least a storage device 1340, the processor 1302, and a controller 1313. The controller 1313 can be used to interface with and control different equipment through an equipment control bus 1314. The electronic device 1300 can also include a network/bus interface 1311 that couples to a data link 1312. In the case of a wireless connection, the network/bus interface 1311 can include a wireless transceiver.

The electronic device 1300 also include a storage device 1340, which can include a single disk or a plurality of disks (e.g., hard drives), and includes a storage management module that manages one or more partitions within the storage device 1340. In some embodiments, storage device 1340 can include flash memory, semiconductor (solid state) memory or the like. The electronic device 1300 can also include a Random Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the electronic device 1300.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for use with an electronic device, the accessory device comprising:
   a first section;
   a second section;
   a hinge that rotationally couples the first section with the second section;
   a first magnet located in the first section, the first magnet configured to provide a magnetic coupling with a device magnet located in the electronic device; and
   a second magnet located in the first section, the second magnet configured to provide a magnetic repulsion to the device magnet, wherein the magnetic coupling maintains the electronic device with the first section, and the magnetic repulsion provides a force such that the electronic device is suspended and lacks contact with the second section.

2. The accessory device of claim 1, wherein the first section comprises:
   a first segment; and
   a second segment, wherein the first segment is rotationally coupled to the second segment.

3. The accessory device of claim 2, wherein the hinge is coupled with the first section at the second segment.

4. The accessory device of claim 2, wherein the first segment is larger than the second segment.

5. The accessory device of claim 2, wherein the first magnet and the second magnet are located in the first segment.

6. The accessory device of claim 1, wherein the second section comprises a keyboard.

7. The accessory device of claim 1, wherein:
   an open position comprises the electronic device suspended and lacking contact with the second section, and
   a closed position comprises the first section combining with the second section to cover the electronic device.

8. An accessory device for use with an electronic device, the accessory device comprising:
 a keyboard section; and
 a cover section rotationally coupled to the keyboard section by a hinge, the cover section comprising:
  a first segment comprising a magnet configured to magnetically couple with a device magnet of the electronic device, and
  a second segment, wherein the first segment is rotationally coupled to the second segment by an embedded hinge,
 wherein the cover section is configured to hold and suspend the electronic device at the first segment such that the electronic device is not in contact with the keyboard section.

9. The accessory device of claim 8, wherein:
 the magnet defines a first magnet,
 the cover section further comprises a second magnet configured to provide a magnetic repulsion to the device magnet, and
 the magnetic repulsion provides a force such that the electronic device is suspended over the keyboard section.

10. The accessory device of claim 9, wherein the first magnet and the second magnet are located in the first segment.

11. The accessory device of claim 8, further comprising electrical contacts located on the first segment, the electrical contacts configured to electrically couple the electronic device with a keyboard located on the keyboard section.

12. The accessory device of claim 8, wherein the hinge is coupled with the cover section at the second segment.

13. The accessory device of claim 8, wherein the first segment is larger than the second segment.

14. The accessory device of claim 13, wherein the hinge is coupled to the second segment of the cover section.

15. A method for holding an electronic device, the method comprising:
 by an accessory device:
 providing, by a first magnet located in a first section of the accessory device, a magnetic coupling with a device magnet of the electronic device, the magnetic coupling maintaining the electronic device with the first section; and
 providing, by a second magnet located in the first section, a magnetic repulsion to the device magnet, the magnetic repulsion providing a force such that the electronic device is suspended and lacks contact with a second section that is rotationally coupled with the first section.

16. The method of claim 15, wherein providing the magnetic in the first section comprises:
 providing a first segment of the first section; and
 providing a second segment that is rotationally coupled to the first segment.

17. The method of claim 16, wherein the first segment carries the first magnet.

18. The method of claim 16, wherein the first segment is larger than the second segment.

19. The method of claim 16, wherein the second segment is secured with the second section by a hinge, and wherein the hinge allow the first section to rotate relative to the second section.

20. The method of claim 15, wherein the second section comprises a keyboard.

* * * * *